April 5, 1966   R. M. MEADE ETAL   3,245,044
AUTOMATIC PROGRAM SUSPENSION SYSTEM
Filed Nov. 16, 1961   12 Sheets-Sheet 1

INVENTORS
ROBERT M. MEADE
EUGENE D. CONROY
BY
ATTORNEY

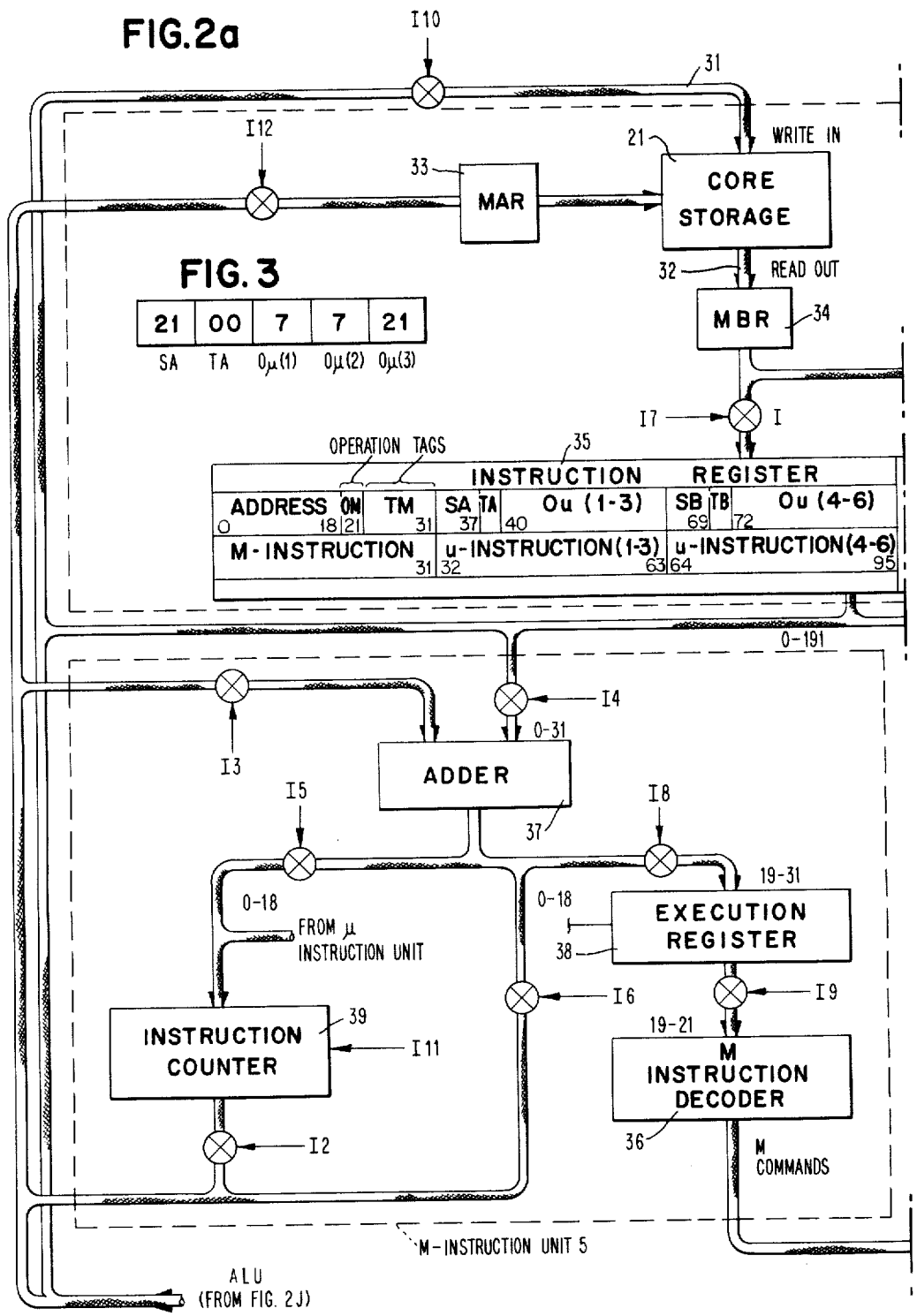

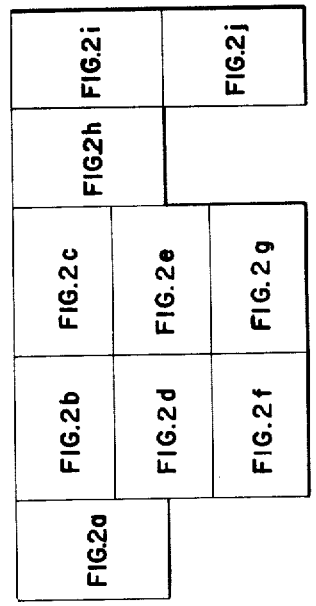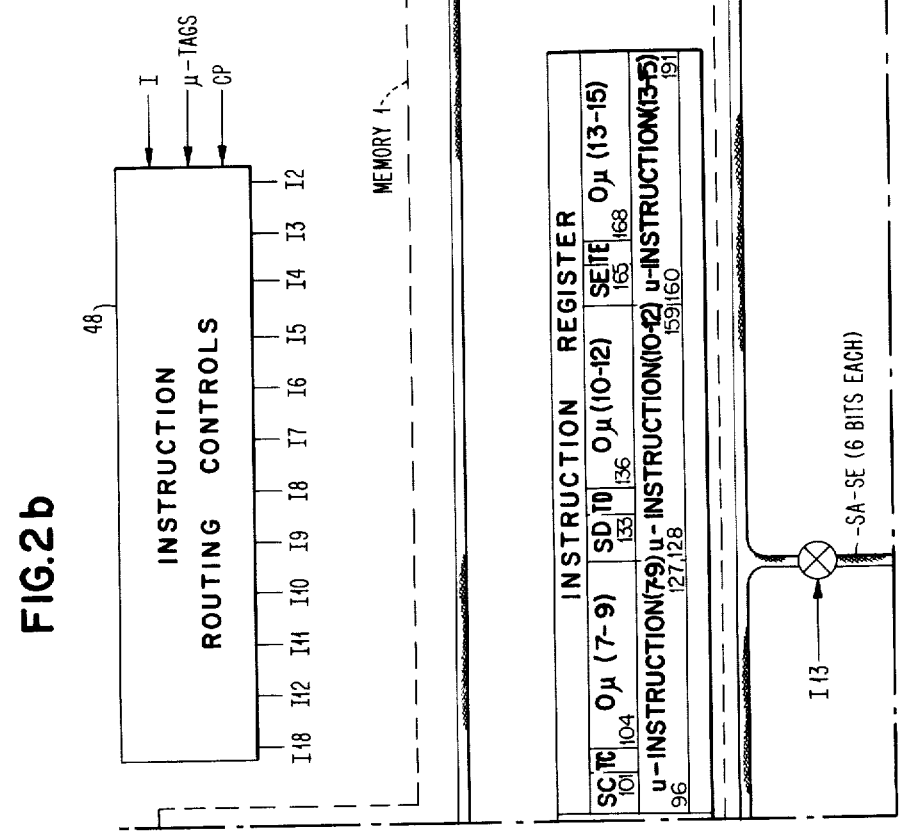

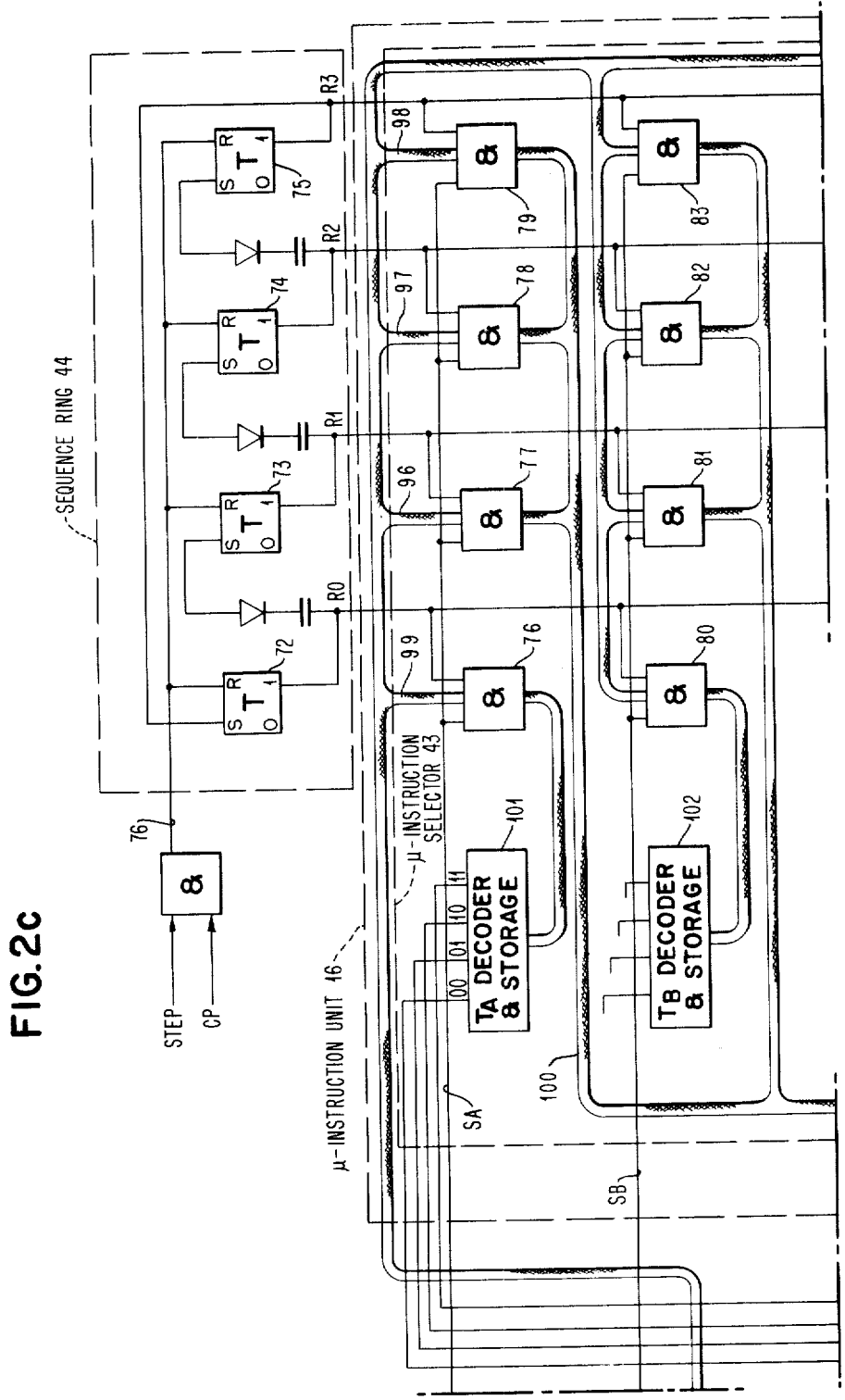

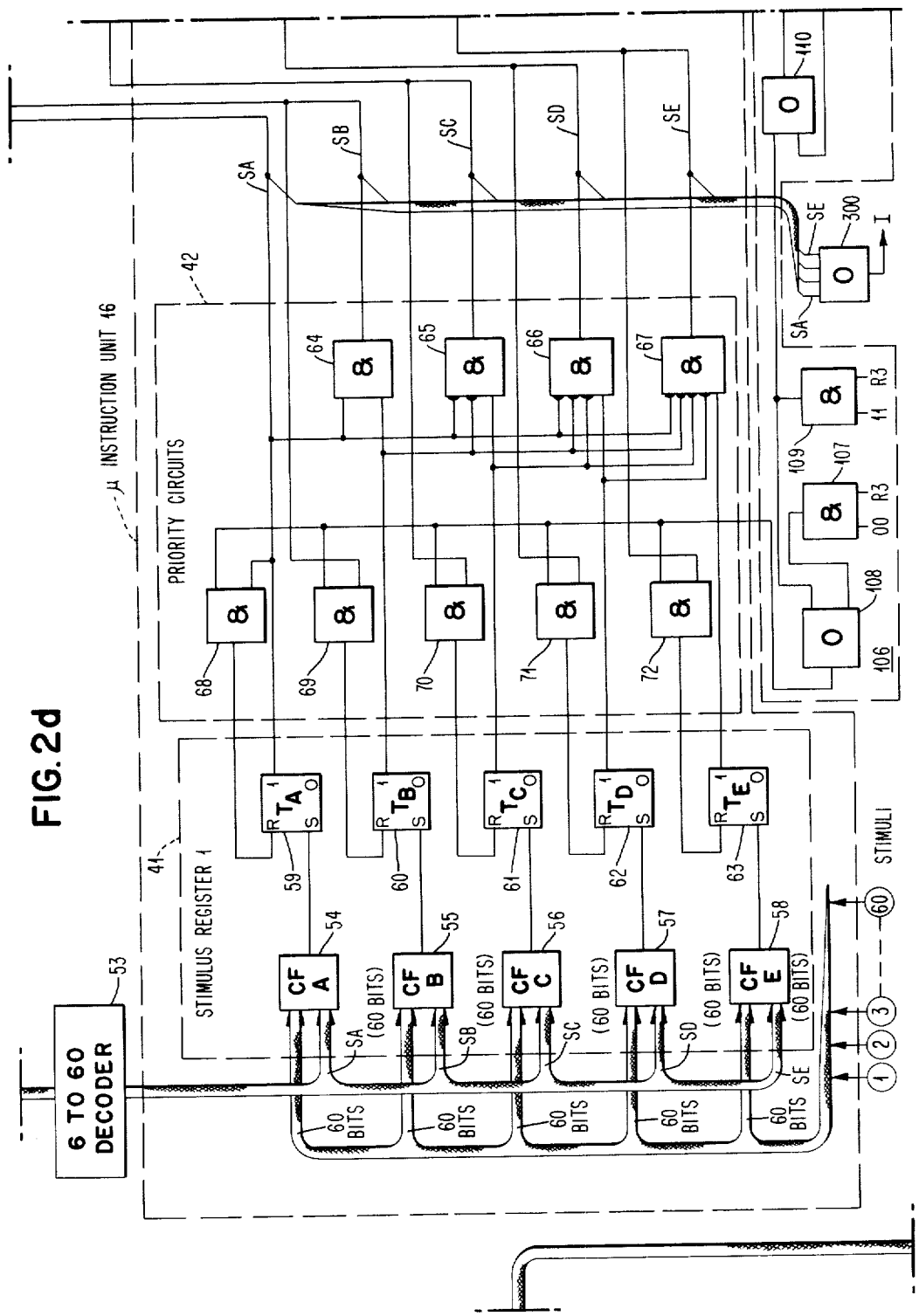

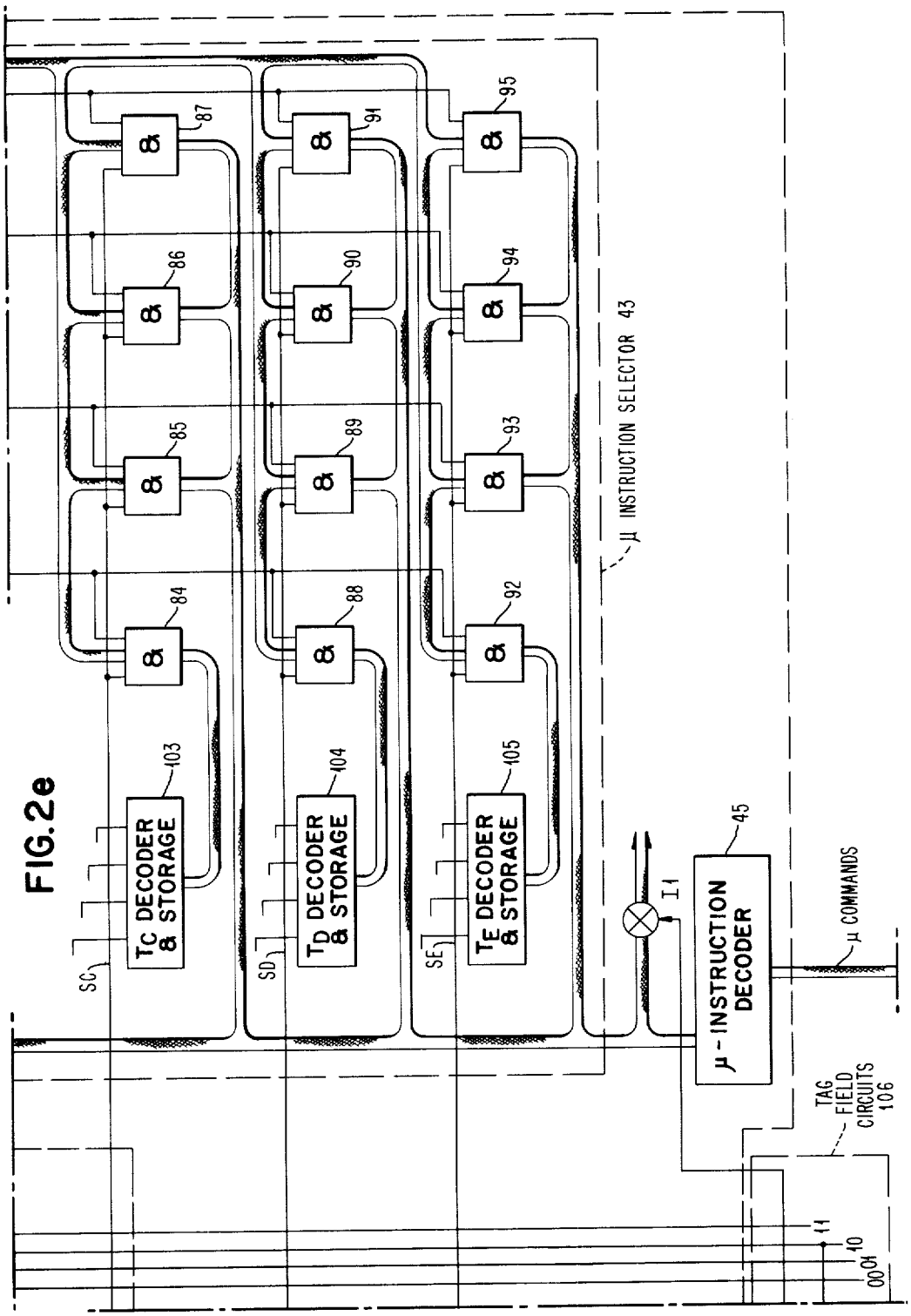

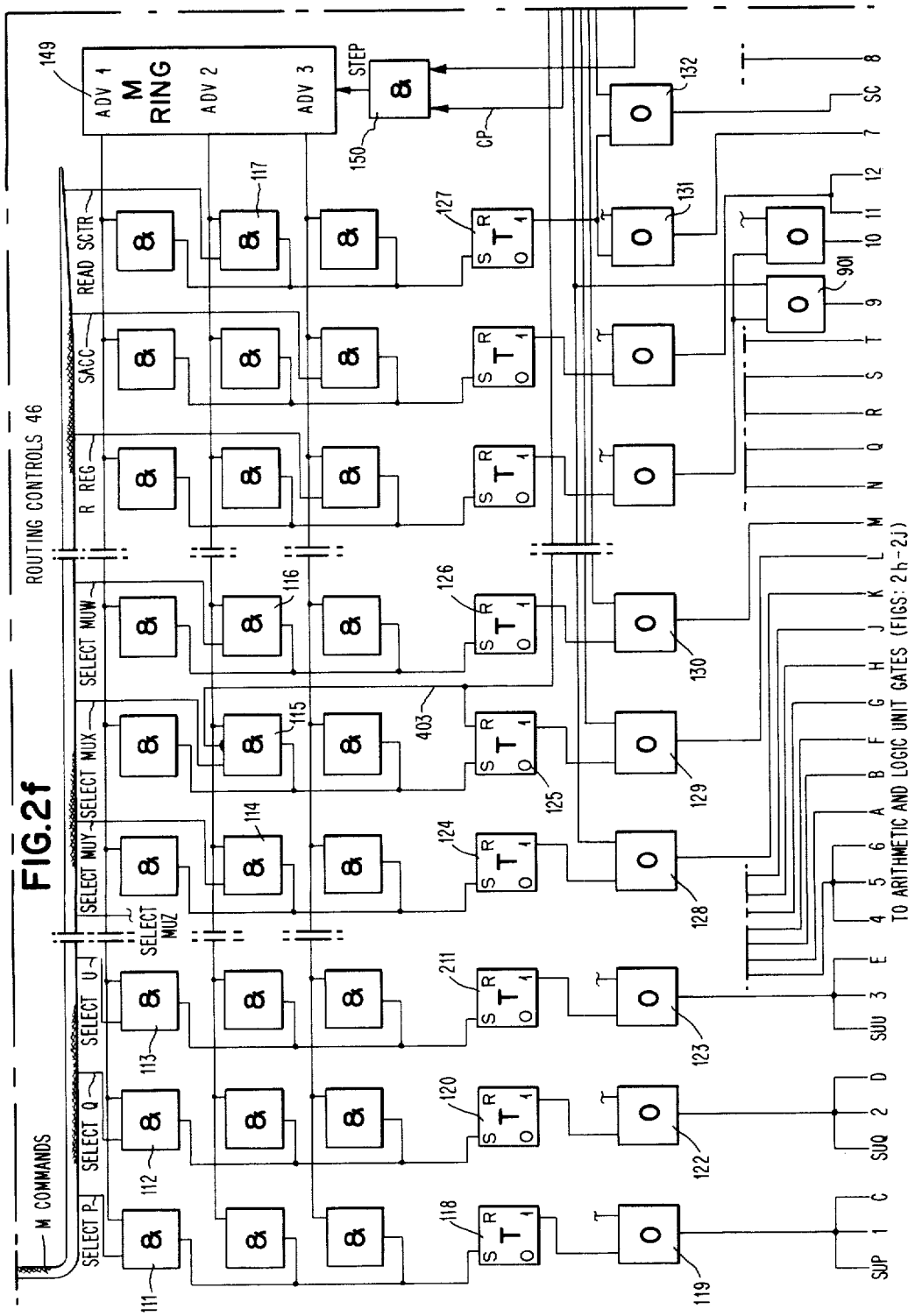

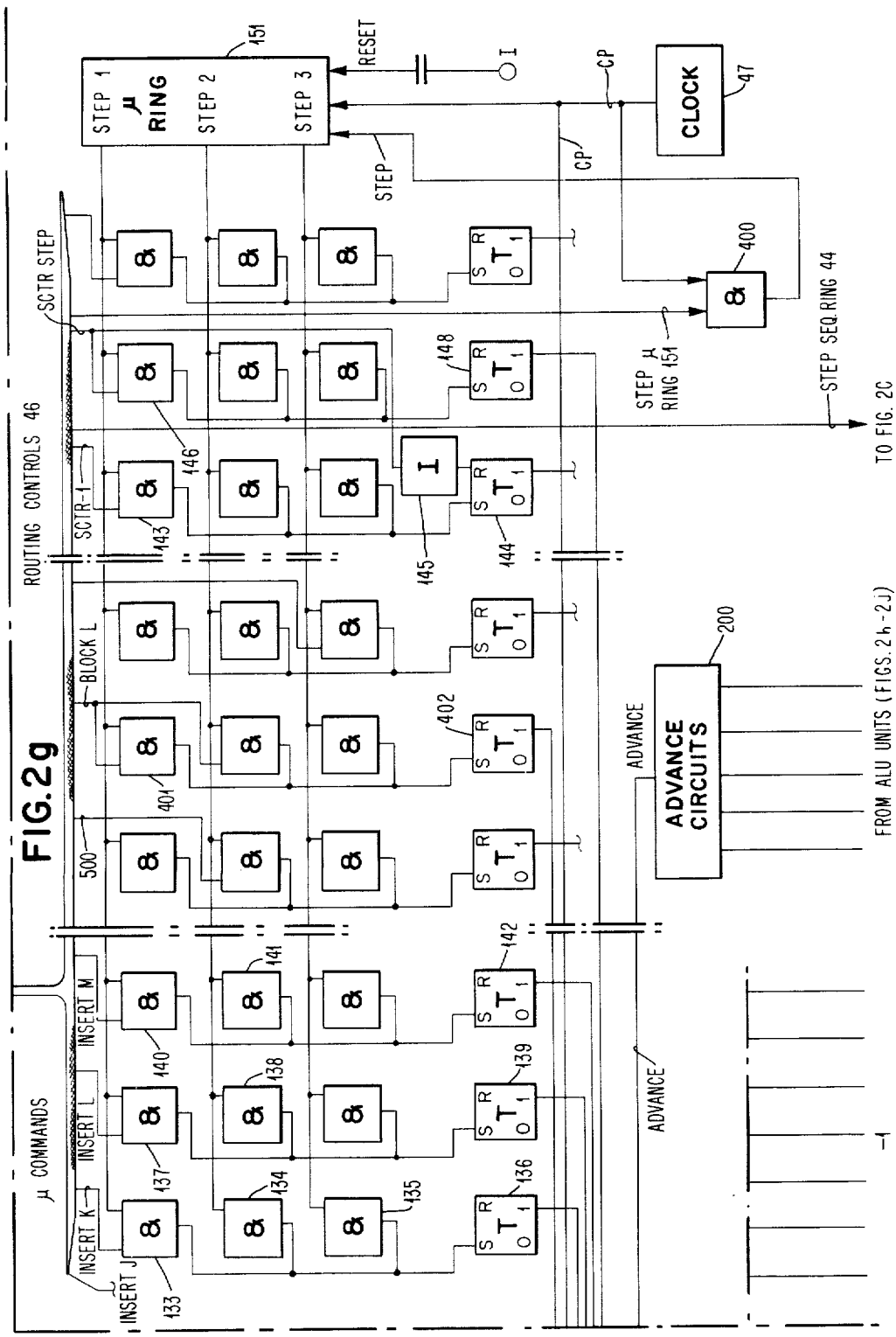

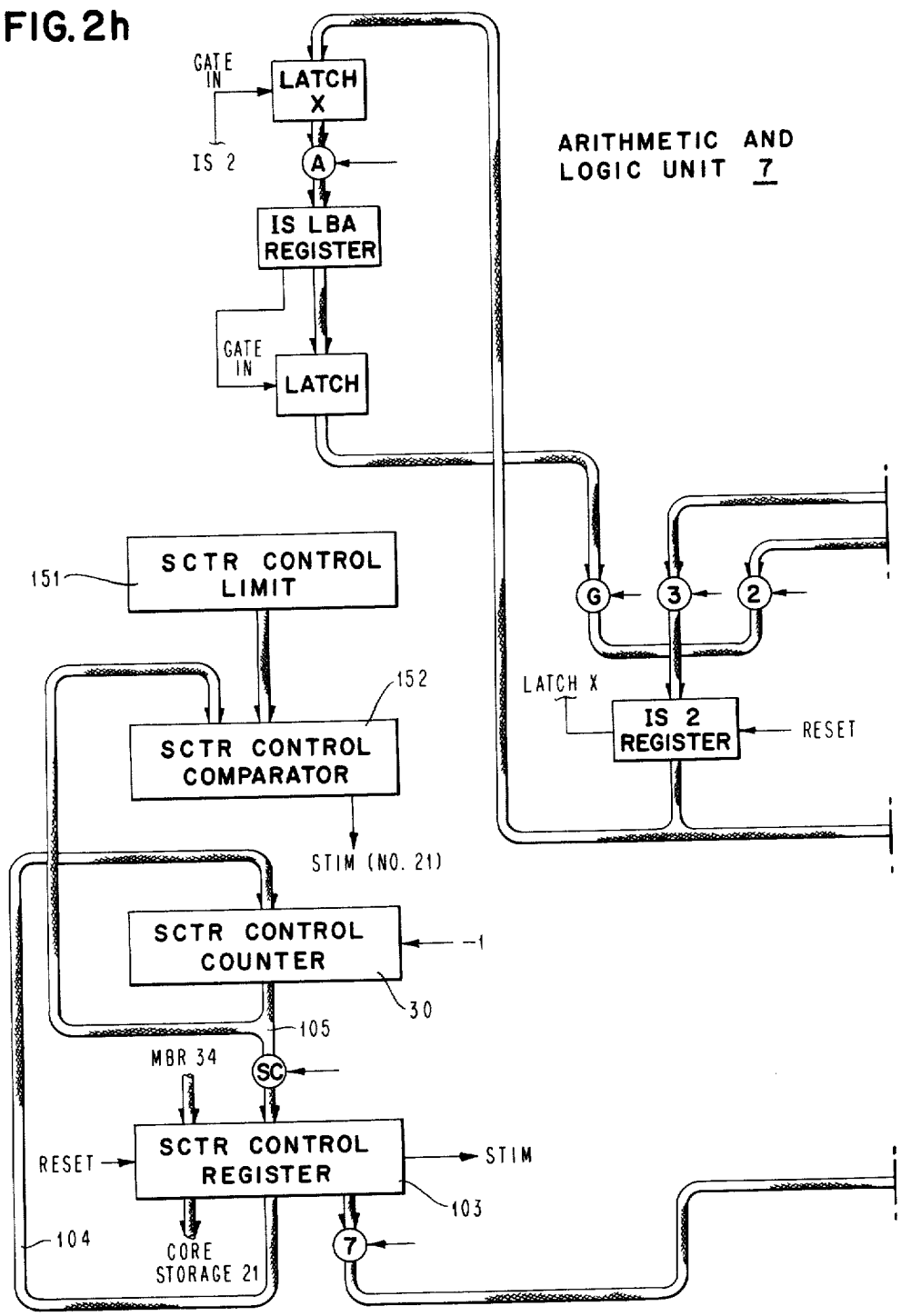

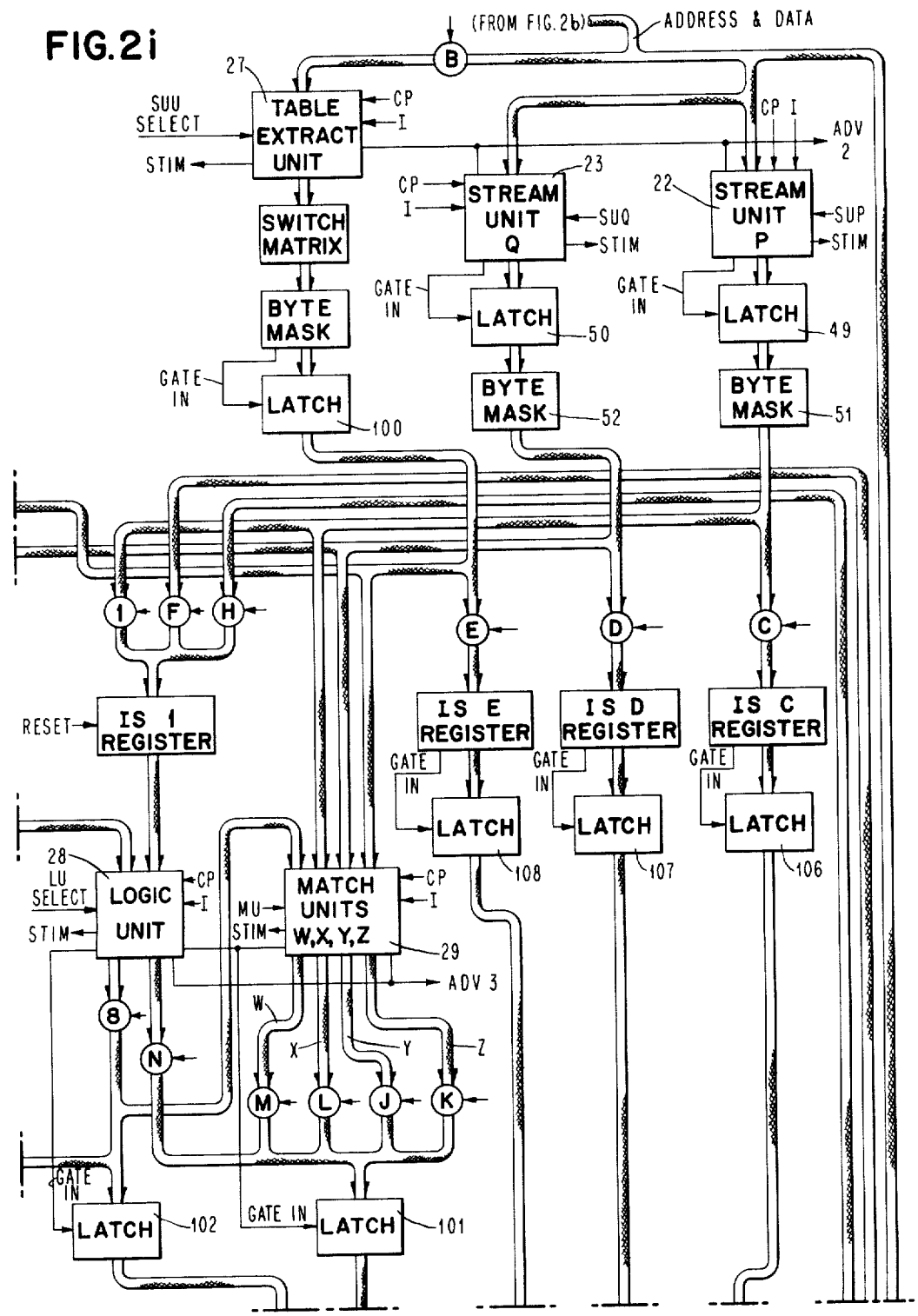

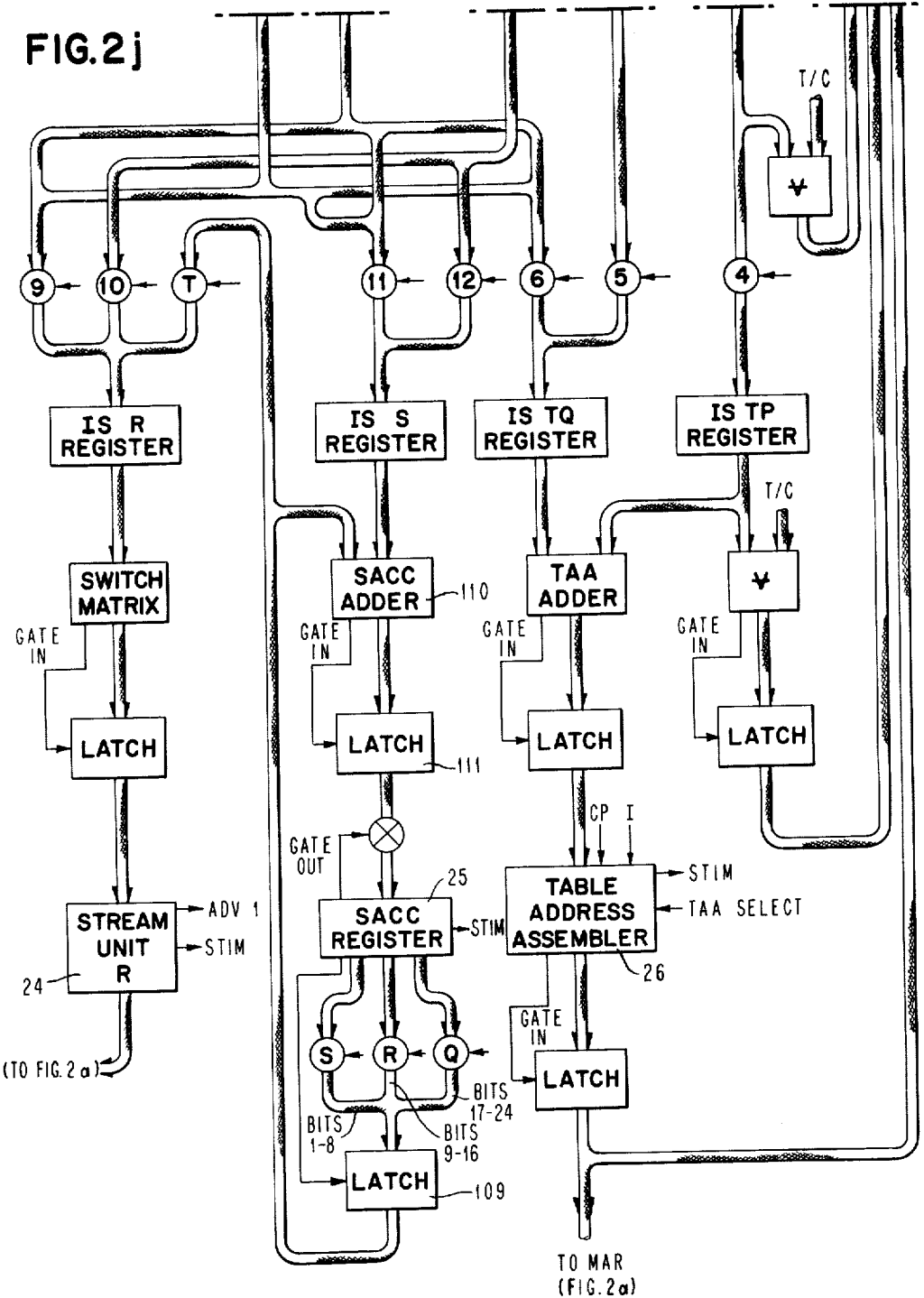

April 5, 1966  R. M. MEADE ETAL  3,245,044

AUTOMATIC PROGRAM SUSPENSION SYSTEM

Filed Nov. 16, 1961  12 Sheets-Sheet 12

United States Patent Office
3,245,044
Patented Apr. 5, 1966

3,245,044
AUTOMATIC PROGRAM SUSPENSION SYSTEM
Robert M. Meade, Wassaic, and Eugene D. Conroy,
Poughkeepsie, N.Y., assignors to International Business
Machines Corporation, New York, N.Y., a corporation
of New York
Filed Nov. 16, 1961, Ser. No. 152,730
16 Claims. (Cl. 340—172.5)

This invention relates to electronic circuitry. More particularly, this invention relates to a program-controlled electronic data processing system wherein the execution of a normal sequence of instructions is ended upon the occurrence of specified conditions and specified instructions outside the normal sequence are executed instead.

Electronic data processing systems usually comprise a number of units such as memories, arithmetic units, logic units, input/output units, etc. The operations of each of these units and the flow of data among these units is controlled by control circuits, which are usually grouped into one unit called a "central control." The central control operates routing gates, in cables connecting the units, and initiates independent operation of those units having their own control circuits.

The central control operates in accordance with a program of instructions stored in the memory. In a typical system, these instructions are accessed in a sequence determined by an instruction counter, making the instructions available one by one for execution by the central control. For example, if an "add" instruction is accessed by the instruction counter, the central control causes operands, specified by the instruction, to be transferred from the memory to the arithmetic unit inputs. If a "store" instruction follows the "add" instruction the results of the arithmetic operations will be gated, by the central control, from the arithmetic unit output to the memory. Normally, the instruction counter steps through the program of instructions stored in memory from one location to an adjacent location, in sequence.

Occasionally, conditions occurring in the system require a change in the sequence of execution of the program of instructions. For example, instead of taking the "add" and "store" instructions previously mentioned in order, it may be necessary upon the sensing of an overflow condition in the arithmetic unit to perform a corrective "shift" instruction and to repeat the "add" operation before the result is stored. The "shift" instruction adjusts an operand to correct the overflow condition so that a proper-length result will follow repetition of the "add" instruction. The instruction sequence will, upon the occurrence of an overflow, become "add," "shift," "add," "store," instead of "add," "store." Prior art devices used for changing the sequence of instructions from the normal stored program sequence were of the "manual" and "automatic" types.

The manual program interrupt requires a scattering of "condtional branch" instructions throughout the program. These "branch" instructions cause the transfer of the program to another instruction, not in the normal sequence, if a specified condition is met. For example, a "branch" instruction may be placed between the "add" and "store" instructions to test for an overflow condition. This "branch" instruction transfers the program to the location of a "shift" instruction if, and only if, the overflow condition occurs. The "shift" instruction may be followed by an additional "add" instruction, if desired, before the normal sequence is returned to. If the overflow condition does not occur, the "branch" instruction has no effect and is followed in the normal sequence by the "store" instruction. Since it is not always possible for the programmer to predict when a specified condition will occur, it is necessary to scatter "branch" instructions throughout the program at points where the specified condition may occur. Further, since "branch" instructions usually test only one specified condition, a separate "branch" instruction must be supplied for each condition to be monitored.

Automatic program interrupt is an improvement over the manual program interrupt in that it does not require the scattering of numerous "branch" instructions throughout the program. Instead, whenever one of any number of specified conditions occurs there is an automatic transfer to an instruction, or "subroutine of instructions, at a point in the program not in the normal sequence. For example, whenever an overflow condition occurs during the execution of an instruction a "shift" instruction will be automatically executed, upon the completion of the present instruction. This will occur whether or not the instruction during which the overflow occurred was an "add" instruction.

In the manual program interrupt scheme it is necessary to take one entire instruction execution time to regularly interrogate desired conditions prior to executing corrective instructions outside the normal instruction sequence. Conditions must be interrogated separately, one at a time, even when the condition may not have occurred. This wasteful procedure is greatly reduced in the automatic program interrupt scheme in that branch instructions are not needed for changing the sequenec of instructions. All the conditions are simultaneously checked, and program time is interrupted only when a condition occurs. However, in the automatic program interrupt scheme it is still necessary to await the completion of the instruction being executed at the time the condition occurs. If a condition were to change the sequence of instructions prior to the completion of the present instruction. information being handled by the present instruction would be destroyed. Since it is impossible to predict when a condition will occur, the failure to execute an instruction would destroy the effectiveness of the program.

Due to the length of time required to execute many instructions, it is undesirable to wait until the completion of an instruction before conditions occurring during the instruction can be given effect. For instance, if an overflow condition occurs during the execution of a "multiply" instruction, a single "shift" instruction may prevent the entire multiplication operation from being in error. Since the time required to complete the execution of a "multiply" instruction is quite long, it is inefficient to wait for the completion of a "multiply" instruction before making the correction. Instructions which perform a large number of similar operations are called "macro-instructions" (M-instructions), and those that perform a relatively small number of simple operations are called "micro-instruction" ($\mu$-instructions). Examples of M-instructions are "multiply," "divide," "squareroot," etc., each performing a repetitive series of operations such as additions, shifts and subtractions. Examples of $\mu$-instructions are "shift," "count," "reset," etc., and other simple operations requiring few steps to be executed. Intermediate scale operations (such as "addition"), strictly speaking, are neither M-instructions nor $\mu$-instructions. However, since they cause groups of still simpler operations to occur, they will also be called M-instructions herein.

In prior manual and automatic program interrupt systems the apparatus for transferring from a normal sequence of instruction execution to another sequence also results in waste of time. For example, when a condition requiring a change in the sequence of instruction execution is sensed in either system, it is necessary to replace the address of the present instruction in the instruction counter (or its equivalent) with the address of the first out-of-sequence instruction. In the manual program interrupt system this address is specified in the "branch" instruction itself, while in the automatic program interrupt system this address is automatically generated as a function of conditions as they occur. If more than one out-of-sequence instruction is to be executed, the instruction counter will be stepped by one for each instruction. The execution of one or more instructions outside the normal sequence (or routine) is here called the execution of a "subroutine."

It is necessary to remember the contents of the instruction counter so that the original sequence can be returned to after execution of the subroutine is completed. This usually requires that the instruction counter contents be stored in memory before the address of the first instruction of the new subroutine is entered in the instruction counter. Repeated access to memory causes time to be wasted in transferring from one sequence to another: (1) the present contents of the instruction counter must be stored in memory; (2) the first instruction of the new subroutine must be read from memory into the instruction counter; and (3) the first instruction outside the normal sequence must be read from the memory location specified by the instruction counter. Still more time is taken after a subroutine is executed to return to the normal sequence of operations.

Instructions forming a subroutine, even though they specify simple operations, must still be "interpreted" prior to execution as any other instruction must be. Interpretation (decoding) refers to examination of an instruction to determine what operations are specified and the generation of appropriate signals to initiate execution of the specified operations. In the prior art interrupt schemes discussed the time allotted for interpretation is substantially the same for all instructions.

The conditions which cause an interrupt are specified by the "branch" instruction in the manual scheme and by a combination of permanent circuitry and a variable "mask" in the automatic interrupt scheme. A condition in the automatic scheme can cause a transfer to a non-sequential instruction only if the mask specifies that this condition is active. In neither case is it possible for an instruction to specify the conditions which, if they occur during its execution, will result in an interrupt. For example, it is possible that an overflow occurring during one "add" instruction should be ignored, while at another point in the program an overflow during another "add" instruction should cause a "shift" instruction to be executed, while at still another point some condition other than overflow may be the determining factor in causing the interrupt.

It is therefore an object of this invention to provide apparatus for permitting the automatic suspension of the execution of macro-instructions (M-instructions) upon the occurrence of prespecified conditions, to permit the execution of micro-instructions μ-instructions).

It is still another object of this invention, in a system wherein instructions forming a program are removed from a memory for execution in sequence, to permit the execution of non-sequential instruction with additional access to the memory.

It is a further object of this invention to provide apparatus in a stored-program data processing system, wherein access is given to the storage locations of instructions forming said program in a normal sequence, for permitting the execution of an instruction subroutine not in the normal sequence without additional access to storage.

Still another object of this invention is to provide apparatus, in a program controlled data processing system, having a variable instruction interpretation time, for permitting the interpretation of instructions in a normal sequence within a first period and the interpretation of instructions outside said sequence within a period less than said first period.

It is a further object of this invention to provide apparatus, in a program controlled system, for permitting the order of execution of instructions to be varied in accordance with conditions defined in association with the instruction being executed at the time the specified condition occurs.

An additional object is to provide apparatus for permitting the executive of macro-instructions to be temporarily suspended in favor of a non-sequential micro-instruction upon the occurrence of a condition specified in association with said instructions.

Still another object is to provide apparatus in a stored program system for permitting temporary suspension of the execution of a macro-instruction received from storage to permit execution of micro-instructions without additional storage access upon the occurrence of conditions specified in association with the instructions.

A still further object is to provide apparatus in a stored program data processing system wherein the execution of a sequentially selected macro-instruction interpreted during a first period is temporarily suspended in favor of the execution of a non-sequential subroutine of macro-instructions, without additional selection of micro-instructions from storage, upon the occurrence of conditions specified in association with said instructions.

The foregoing and other objects, features and advantages of the invention will be apparent from the following more particular description of the preferred embodiment of the invention, as illustrated in the accompanying drawings.

These objects are attained in the apparatus of this invention by utilizing composite instructions which comprise both normal instructions (which may or may not amount to macro-instructions) and groups of micro-instruction subroutines. The identity of the condition, or "stimulus," which will cause a subroutine of μ-instructions to be executed is associated with each subroutine in the composite instruction. Since each composite instruction specifies all the associated branch conditions (stimuli) as well as subroutines, it is possible to immediately suspend execution of the macro-instruction portion, if selected micro-instructions are to be executed, at any point in the execution of the macro-instruction without additional access to memory.

Typical prior art instruction formats include an operation field specifying the type of instrument to be executed, an address field specifying the location of data in memory to be operated upon in accordance with the operation field, and a tag field for indicating certain special operations (such as indexing). The apparatus utilizing this invention uses an instruction format including the normal operation, address and tag fields, forming a so-called macro-instruction, plus operation field and tag field portions of a number of μ-instructions arranged into groups. Associated with each μ-instruction group is a stimulus field which indicates by coding which machine stimuli will cause the execution of the associated μ-instruction group.

Composite instructions are stored in memory, and are accessed as a single unit by an instruction counter. The M-instruction operation field and μ-instruction operation fields are thus both available for interpretation (decoding), though the μ-instructions may never be executed. In the event a μ-instruction is to be executed, the M-instruction execution is immediately suspended, and a μ-instruction is decoded. Since all operations preparatory to interpretation of the μ-instruction have been performed, much less time is required to initiate execution of a μ-instruction than of the M-instruction.

The M-instruction operation code normally controls the operation of manipulative gates within the system. The M-instruction operation code also controls the initiation of the operation of those independent units such as the arithmetic units which have their own gate controls.

These gates and independent units operate in accordance with the M-instruction at times partially controlled by a clock. Upon the occurrence of prespecified conditions (stimuli) groups of $\mu$-instructions may take over the operation of the manipulative gates. Clock derived signals which normally operate the gates and step the independent units forward during the execution of the M-instruction are inhibited from transferring, or changing, any data except under $\mu$-instruction control. The clock signals continue to occur during the suspension of the M-instruction execution, but their function of timing data transfers is suspended, in effect "freezing" the system. The clock signals may be used to make adjustments in accordance with the $\mu$-instructions. If M-instruction execution is resumed, the clock signals cause execution to commence from the point at which they were inhibited.

For example, during the execution of a "multiply" instruction a shift register, having an output gate and a shift input is usually utilized. Assume that the output gate is operated at clock pulse 2, and the shift input is operated at clock pulse 3. Assume further that the "multiply" instruction is suspended at clock pulse 2 before operation of the output gate, and that a single $\mu$-instruction "shift" is to be executed. The $\mu$-instruction will cause a shift input to occur during the next clock pulse which would normally have operated the output gate had it not been blocked from doing so. If no other $\mu$-instructions are to be executed, normal operation is restored at the point of suspension. The clock is adjusted so that the next clock pulse will operate the output gate as though there had been no suspension of execution at all. The effect of the $\mu$-instruction has been to shift the register one more position than it would normally have been shifted. It is obvious that alternative clock circuits may be used. For instance, two clocks may be supplied, one for M-instructions and the other for $\mu$-instructions, the first being stopped whenever an M-instruction is to be suspended.

The apparatus of this invention permits a plurality of conditions specified in a composite instruction to suspend the execution of an M-instruction, permitting the immediate performance of non-sequential $\mu$-instruction subroutines specified in the composite instruction in association with the suspending condition. This type of system is useful as an improvement in systems utilizing manual and automatic program interrupt, where it is necessary to make corrective adjustments as a result of indicated conditions. Every instruction may specify conditions, and adjustments to be made when the conditions occur.

In the figures:

FIGURE 1b is a drawing showing a portion of an illustrative instruction format usable by the apparatus of FIGURE 1a.

Figure 1A:
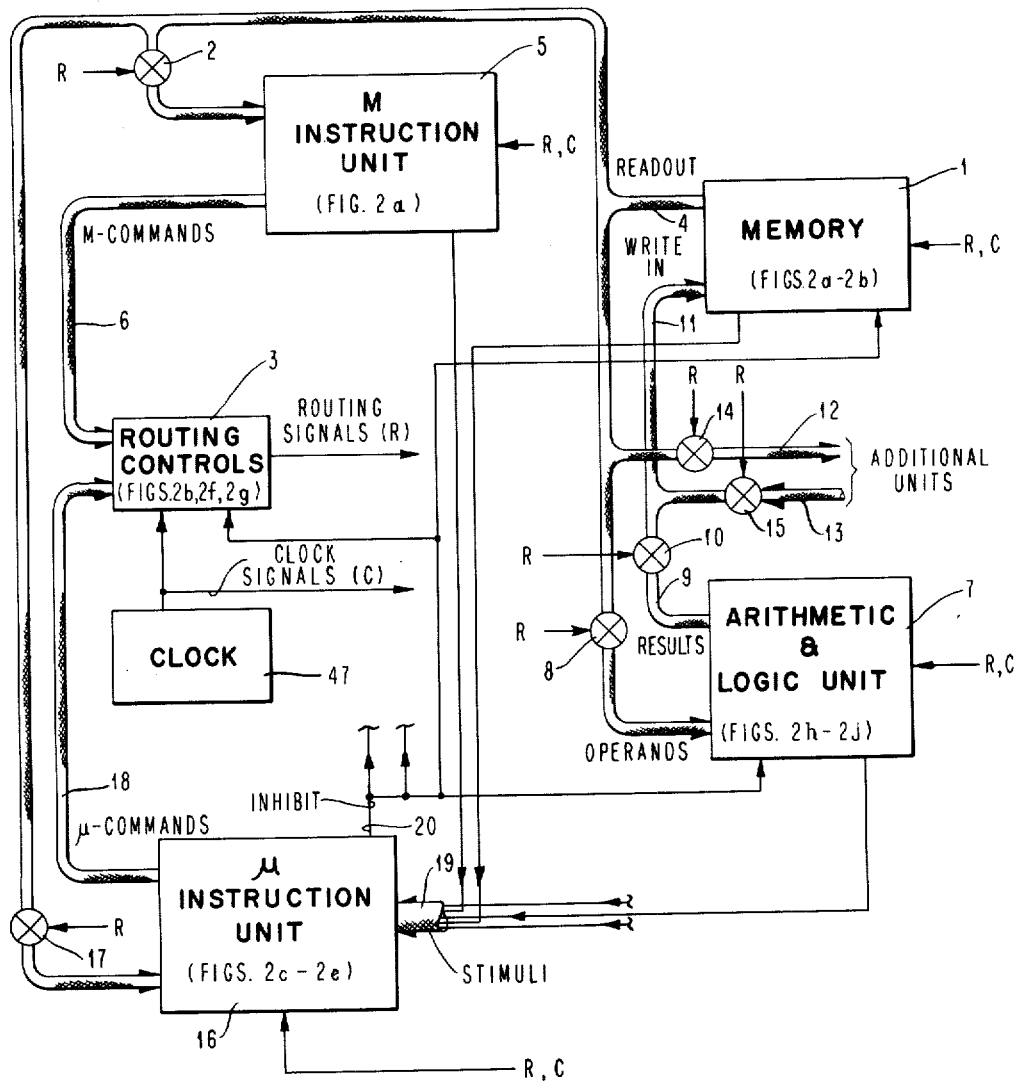
FIGURE 1a is a block diagram showing apparatus embodying the invention.

FIGURES 2a, 2b, 2c, 2d, 2e, 2f, 2g, 2h, 2i and 2j, when arranged in accordance with FIGURE 2k, form a detailed logic diagram of apparatus similar to that shown in FIGURE 1a.

FIGURE 3 is a line drawing of an illustrative instruction format usable by the apparatus of FIGURES 2a–2j.

Figure 4A:
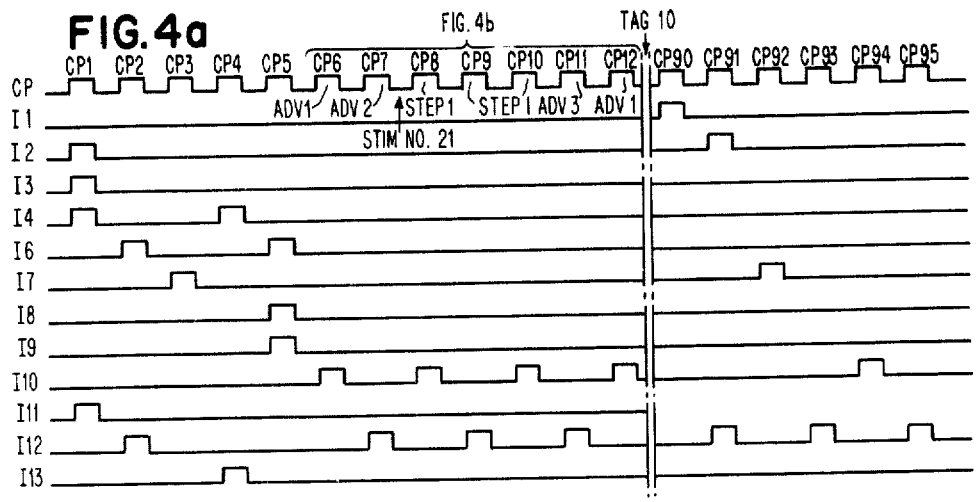
Figure 4B:
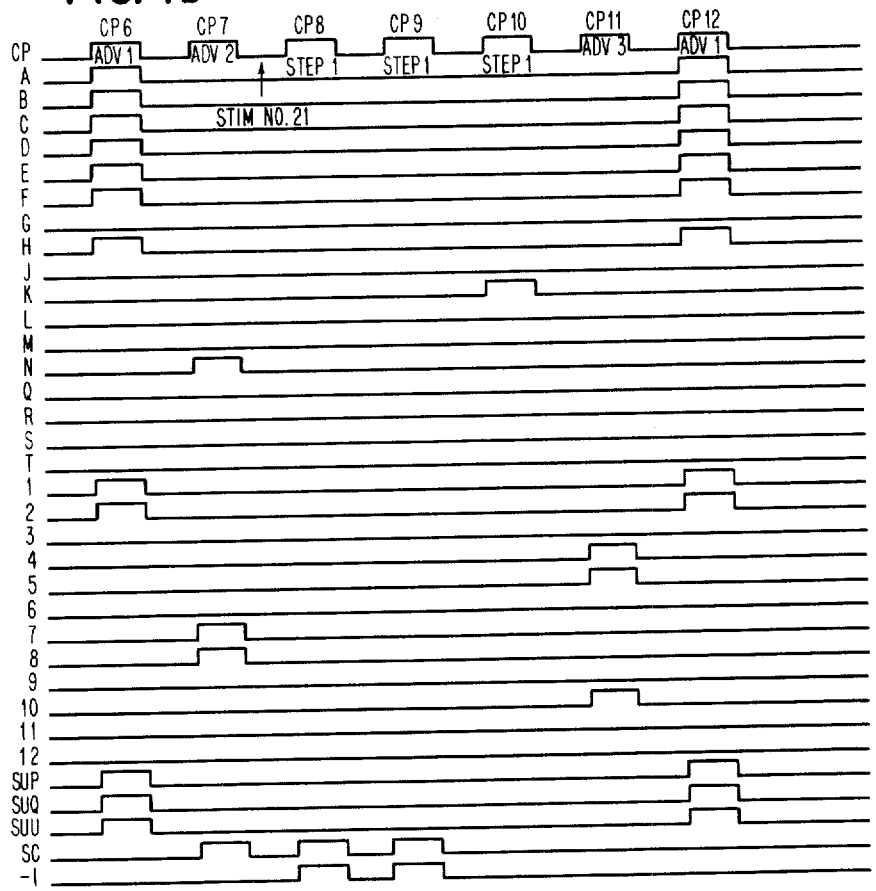

FIGURES 4a and 4b are pulse diagrams showing signals found in the embodiment of FIGURES 2a through 2j during an illustrative operation.

GENERAL DESCRIPTION

Referring to FIGURE 1a, there appears a block diagram of a data processing system embodying the invention. This simplified system comprises a number of independently operable units including a memory 1, an arithmetic and logic unit 7, routing controls 3, clock 47, an M-instruction unit 5, and a $\mu$-instruction unit 16. Each of these units is independent insofar as each performs its function, once it is started, without external controls except for clock signals which are awaited at fixed points in the operation. The routing controls 3 emit routing signals R, at times which are a function of clock signals C, for operating data transfer gates and for initiating operation of the independent units. Clock signals C are also supplied to the independent units.

Figure 1B:
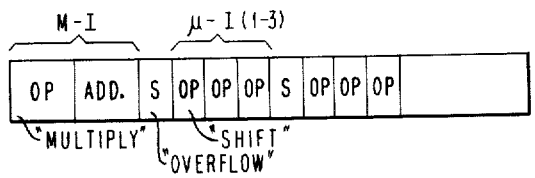

Referring to FIGURE 1b, programs of composite instructions, each including one or more M-instructions M-I and a number of $\mu$-instruction groups $\mu$-I (1–3), etc., are stored in the memory 1. M-instructions include an address field and an operation field. Each $\mu$-instruction group includes one stimulus field ($s$) and three operation fields. When a gate 2 is operated by a routing signal R from the routing controls 3 at a time determined by the clock 47, signals representing the M-instruction part are transferred from the memory 1 to the M-instruction unit 5 via the read-out bus 4. The M-instruction operation field in the M-instruction unit 5 results in M-commands on cable 6, which operate the routing controls 3 in accordance with clock signals C, initiating and supervising operations performed on operands indicated by the M-instruction address field. The operands are obtained from the memory 1 under the control of routing signals R from the routing controls 3 that initiate operation of the memory 1, operate the gate 8, and initiate operation of the arithmetic and logic unit 7. Operands are supplied by the memory 1, sent to the arithmetic and logic unit 7, operated upon by the arithmetic and logic unit 7, and results are generated on cable 9. The gate 10 is operated by the routing controls 3 to store the results in memory 1 via the write-in bus 11. The memory 1 and arithmetic and logic unit 7, once selected by a routing signal R, will perform their functions automatically until selected points are reached. A unit will not proceed after such a point is reached until a specified clock signal C occurs.

Operands may also be transferred under control of the routing controls 3 and clock 47 from the memory 1, or from the arithmetic and logic unit 7, to and from additional units connected to cables 12 and 13 by operation of the gates 14 and 15. These additional units may be input/ output units, other memories, etc.

A $\mu$-instruction unit 16 is included in the system. This unit receives the $\mu$-instruction portions of the composite instructions read from the memory 1 on the read-out bus 4, upon operation of the gate 17 by the routing controls 3. The $\mu$-instruction unit 16 generates $\mu$-commands on cable 18 for operating the routing controls 3. The $\mu$-commands are not normally generated on cable 18 at the same time as the M-commands are generated by the M-instruction unit 5 on cable 6 unless specified stimuli are sensed on cable 19. However, the invention may include apparatus which simultaneously provides both $\mu$-commands and M-commands, as long as the $\mu$-commands do not operate the routing controls to generate routing signals R until the specified stimuli are sensed.

Stimuli are generated by the units (such as the M-instruction unit 5 and memory 1) of the system when certain conditons, such as invalid instruction, occur. Referring to FIGURE 1b, each $\mu$-instruction group, of the groups associated with an M-instruction in a composite instruction, has associated with it a stimulus field ($s$) which identifies, in code, the condition which will cause suspension of execution of the M-instruction and which will start execution of the associated $\mu$-instruction group. When a particular stimulus which corresponds to the stimulus field of a $\mu$-instruction group is sensed on cable 19, $\mu$-commands will be generated by the $\mu$-instruction unit 16 (or will be given effect by the routing controls 3, if already generated). An inhibit signal is sent via lines 20 to keep the next clock signal C from advancing the independent units past the present check point. This causes the M-commands to lose control over the routing controls 3, in effect "freezing" the system.

For example, referring again to FIGURE 1b, assume that a composite instruction having a "multiply" M-instruction portion has been read from the memory 1. This "multiply" instruction includes an operation part specifying the "multiply" operation, and an address field indicating the the location of operands in memory 1. A number of μ-instruction groups will be associated with the M-instruction of which two μ-instruction groups are shown in FIGURE 1b. Assume in this example that the stimulus fields associated with the first group of three μ-instructions μ-I (1–3) identifies an "overflow" in the arithmetic and logic unit 7. Assume further that the first μ-instruction operation code indicates a "shift" adjustment. The other μ-instructions may indicate the same, other or no operations.

Initially, the gates 2 and 17 are operated by the routing controls 3 at times indicated by the clock 47 to transfer the M-instruction portion of the composite instruction shown in FIGURE 1b to the M-instruction unit. The μ-instruction operation and stimuli fields are made available to the μ-instruction unit 16. The routing controls 3 emit routing signals R in accordance with M-commands coming from the M-instruction unit 5 on cable 6. The routing signals R operate the gates 8 and 9, and initiate operation of the memory 1 and arithmetic and logic unit 7, to transfer operands from the memory 1 to the arithmetic and logic unit 7 and results from the arithmetic and logic unit 7 to memory 1.

Assume that the execution of the "multiply" M-instruction under the control of the M-instruction unit 5 is not completed when an "overflow" occurs in the arithmetic and logic unit 17. The overflow is indicated by a signal at the stimuli input 19 of the μ-instruction unit 16. Circuits in the μ-instruction unit 16 recognize that this stimulus is one specified by a stimulus field associated with μ-instructions of the present composite instruction. The first μ-instruction operation portion μ-I (1), which is associated with the first stimulus field, causes μ-commands to occur on cable 18 and inhibit signals to appear on lines 20. The inhibit lines 20 signals block the effect of clock 47 signals C on the memory 1 and arithmetic and logic unit 7, preventing the storage of results and taking of additional partial products by the next clock signal. The effect of this is to suspend execution of the "multiply" M-instruction. Routing signals R will be controlled by the μ-commands. The next clock signal C will cause an accumulator shift in the arithmetic and logic unit in accordance with a μ-command on cable 18. Additional μ-instructions μ-I (2) and μ-I (3) associated with the overflow stimulus, if any, are executed by subsequently giving them effect to generate μ-commands. Some μ-commands will cause internal adjustments in independent units, others will operate gates not operated by the M-instruction "multiply," others will disable normally operated gates, etc. Once the three μ-instructions shown to be associated with the first stimulus field are executed, then execution of the "multiply" M-instruction is resumed at the point of suspension. Removal of signals from the inhibit lines 20 permits the clock signals C to advance memory 1 and arithmetic and logic unit 7 past the point at which execution was suspended.

Subsequent stimuli are given effect in the same manner. If more than one stimulus occurs simultaneously (each stimulus being one for which μ-instructions are provided), then the stimuli will be given sequential effect in priority order. Further, by placing an address in the position of the last μ-instruction operation field it is possible to obtain additional μ-instructions from memory, thus extending a subroutine, initiated by the occurrence of a stimulus, indefinitely. However, the speed inherent in the use of only those μ-instructions contained in the composite instruction, is not fully taken advantage of by this additional feature.

DETAILED EMBODIMENT

FIGURES 2a through 2j, when assembled as shown in FIGURE 2k, form a logic diagram of the illustrative data processing system embodying the invention explained with reference to FIGURE 1a.

The data processing system, of which the invention disclosed in this application is a part, may be any one of many types, serial, parallel, binary, BCD or otherwise. It is immaterial to the practice of the invention what type is chosen. As an illustration, the organization of a parallel-by-bit, serial-by-byte electronic data processing system will now be described. A byte is defined as a group of bits handled as a unit. It is emphasized, however, that any program-controlled computer can be used with this invention.

Referring to FIGURES 2a–2j, there is shown a data processing system utilizing a high degree of overlapped operation, a powerful instruction set and other logical organization improvements enabling it to reach a very high level of performance. The invention described herein adjusts the flow of information among the various units during the execution of a program, relieving the programmer of the burden of optimizing his program. The instruction set which has been developed for this system exhibits powerful features, very few instructions usually being required to write a given program. This is largely due to the capability of system units to perform their operations independent of external control, once operation is initiated. An instruction which specifies a large number of operations to be executed is commonly called a macro-instruction.

The system includes a core storage 21, a number of stream units 22, 23 and 24 (FIG. 2j) a statistical accumulator (SACC) 25, (FIGURE 2j), a table address assembler 26, a table extract unit 27 (FIGURE 2i), a logic unit 28, a match unit 29, and a statistical counter (SCTR) 103 (FIGURE 2h). Information moves into and out of the core storage 21 via the write-in bus 31, and the read-out bus 32, at locations indicated by a memory address register (MAR) 33. Information which leaves core storage 21 on the read-out bus 32 from locations specified by MAR 33, is stored in a memory buffer register MBR 34. Information in the MBR 34, if representative of a composite instruction, is sent to the instruction register 35. Information in the MBR 34, if representative of data, is sent to the P and Q stream units 22 and 23. The P and Q stream units 22 and 23 also receive address information from the instruction register 35 output.

An M-instruction decoder 36 (FIGURE 2a) receives the operation code portion of an M-instruction from an adder 37, via an execution register 38, for interpretation purposes. The address portion of the M-instruction is placed in the instruction counter 39 via the adder 37.

The μ-instruction portions of the composite instruction, placed initially in the instruction register 35 along with the M-instruction, are utilized by the μ-instruction unit 16 (FIGURE 2d). The stimuli fields of the μ-instructions are sent to a stimulus register 41 for comparison with sixty (or more) stimuli received from units in the system. If stimuli indicated by stimulus fields correspond to any conditions indicated by received stimuli, the priority circuit 42 will give the stimuli effect in priority order. The μ-instruction selector 43 (FIGURE 2e), in conjunction with a sequence ring 44 (FIGURE 2c) will select μ-instruction operation parts one at a time from the group of μ-instructions associated with the stimulus field given priority by the priority circuit 42. The selected μ-instruction operation fields will be transferred, one at a time, from the instruction register 35 to the μ-instruction decoder 45 (FIGURE 2e). In this way, the μ-instruction decoder 45 will receive a sequence of μ-instruction operation parts whenever a stimulus field (in a composite instruction in the instruction register 35) corresponds to a received stimulus.

The M-commands issuing from the M-instruction decoder 36 and the μ-commands issuing from the μ-instruction decoder 45 are directed to routing controls 3 where, in conjuction with a clock 47, specific gate enabling and unit selecting signals are generated. Signals from the routing controls 46, shown in FIGURES 2f and 2g, operate the inputs of the labelled gates in FIGURES 2h–2j, as well as the "select" inputs of the independent units shown in these figures. Additional gates having inputs labelled with an "I" in FIGURES 2a and 2b are operated by the instruction routing controls 48 shown in FIGURE 2b.

The clock 47 runs continuously, emitting clock pulses (CP) at regular intervals regardless of the state of operation of the system. These clock pulses are utilized by the routing controls 46 (FIGURE 2g) and 48 (FIGURE 2b) to time operation of the system, as a function of system states. Obviously, this is a matter of choice, a clock which is dependent upon system conditions being an equivalent.

*Arithmetic and logic unit.*—The arithmetic and logic unit shown in FIGURES 2h, 2i and 2j is intended to be illustrative only. Data and addresses received by the P and Q stream units 22 and 23 are usually in a 72-bit parallel binary form. The addresses are received first from the MBR 34, the stream units then independently obtaining data words from the core storage 21 in accordance with the addresses (and other information). From the parallel data the stream units generate a stream of 8-bit bytes.

The operation of these units is described in detail in U.S. patent application Serial No. 65,560, filed October 26, 1960, "Computer Indexing Apparatus," P. S. Herwitz et al., assigned to IBM, which is incorporated herein by this reference.

The stream units SUP or SUQ begin generating streams of bytes when selected by select SUP or SUQ signals. Latches 49 and 50 hold bytes, as received, whenever their gate-in inputs are enabled by the associated stream unit. Normally, the gate-in inputs are enabled at each input CP from the clock 47. When one or more of the output gates (C, D, 1 or 2) are enabled, single bytes are transferred from the latches, through byte masks 51 and 52, to a subsequent unit. The streams generated by the P and Q stream units 22 and 23 may be directed into a number of paths, some of which are selected by gates C, D, F, G, H, 1 and 2. The paths may lead to the match unit 29, the logic unit 28, the ISR register, etc. Thus, the data streams generated by the P and Q stream units 22 and 23 are subject to operations specified by whichever units a stream passes through.

The P and Q stream units (which are in "time zone 1") may generate signals which cause Advance 2 ("enter time zone 2") signals when bytes have been supplied to the associated latches. The Advance 2 signal advances an M-ring 149 in routing control 46 if other units in the system are ready. An inhibit input I may suspend the occurrence of this advance signal. The P and Q stream units also emit stimuli (STIM), listed below, in Table I, when specified conditions occur.

The match units 29 monitor the P and Q streams as well as streams from the table extract unit 27 and the logic unit 28, both of which will be explained below. There are four match units labelled W, X, Y and Z, each supplying a single latch 101 via one of the gates M, L, J and K, in that order. Independent operation is initiated by an MU input. In general, each one of the four match units operates in the same manner. A "setup" byte may be specified for each unit. If a stream byte and a setup byte are the same, a match exists. Various operations may be performed as a result of a match, for example, the matched byte may be either inserted into, or eliminated from, the stream. Match unit 29 operation is initiated by an MU select signal. The match unit 29 may emit a signal which will cause an advance 3 signal, unless an inhibit signal I has occurred. Stimuli may be emitted.

The logic unit 28 is fed by the IS1 and IS2 registers. Any one of sixteen logical connective or sixteen arithmetic operations may be performed upon the operand bytes in these registers. The results are sent to the match unit 29 or to the latches 101 and 102. Signals which may result in an advance 3 signal are emitted if no inhibit signal I occurs. Stimuli signals are generated. Independent operation is initiated by an LU select input.

The table extract unit 27 and the table address assembler 26 (FIGURE 2j) act together in the execution of table look-up instructions which may control byte streams independent of system operation. The table address assembler 26 initially contains a table base address to which a pair of bytes from the P Stream (ISTP Register) are added, in the TAA adder, to form an effective address. The effective address is sent to the MAR 33 to access the data word containing the desired table value. The data word is received by the table extract unit 27 which selects bytes therefrom, causing a stream of bytes to be generated. This stream is utilized in much the same manner as the P and Q streams. The units 26 and 27 are selected for independent operation by TAA and SUU signals, each may emit stimulus signals. The table extract unit 27 may contribute to the generation of an advance 2 signal, if no inhibit I input occurs.

The statistical accumulator (FIGURE 2j) register 25 holds the sum of its contents and bytes from either the logic unit 28 or the table extract unit 27. The sum, formed in a SACC adder 110, is entered by the adder 110 into a latch 111 from where the statistical accumulator register removes it. The statistical accumulator is by-passed if gates 11 or 12 are not operated. Output gates S, R and Q select different 8-bit bytes from among three bytes which may be stored in the statistical accumulator register 25. Stimuli signals may be emitted.

The statistical counter (SCTR) comprises a SCTR register 103 (FIGURE 2h) for holding a current count and a SCTR control counter 30 for incrementing or decrementing the current count in accordance with a signal at input —1. If there is no signal at input —1, the SCTR control counter 30 output 105 will be the SCTR control register 103 contents incremented by one; a signal at the —1 input causing it to equal the contents decremented by one. The SCTR control register 103 contents are always available to the SCTR control counter 30 via cable 104. The incremented or decremented value will, however, not be used to update the SCTR control register 103 contents unless the gate SC is operated. The register 103 may be reset by a signal at the reset input. Stimuli may be emitted. For example, if the SCTR control counter 30 output 105 indicates a count equal to a count indicated by the contents of the SCTR control limit 151, the SCTR control comparator 152 will emit a stimulus number 21 signal.

The R stream unit 24 (FIGURE 2j) receives a stream of bytes and generates 72-bit words to be stored in core storage 21 as the output of the arithmetic and logic unit shown in FIGURES 2h, 2i and 2j. The R stream unit is explained in detail in U.S. patent application Serial Number 72,440, filed October 31, 1960, "Continuous Streaming Output Unit," R. M. Meade, assigned to IBM, which is incorporated herein by this reference. The R stream unit 24 emits signals, which may cause an advance 1 signal, if no inhibit input I is present. Stimuli signals may also be emitted.

The various units constituting the arithmetic and logic unit 7 may be placed into, or removed from, streams under program direction. Each composite instruction specifies the operation of a different group of gates controlling the stream in accordance with the specified composite instruction. The specific operations performed by each unit are not pertinent here except to explain the operation of the invention, since any computer may be used. Adjustments made by μ-instructions can affect any gate, reset input, etc. Since some of the independent units are not shown in complete detail, not all possible stimuli emission and adjustment points appear in the figures.

FIGURE 4b illustrates the signals that operate the gates of the arithmetic and logic unit 7, these gate signals being supplied by the routing controls 46, to be explained below. At this point, it is only necessary to know that normally each one of three advance signals derived from the clock 47 result in the operation of a different set of gates. The gates are segregated into three time zones; numbers one to three, each being entered as a result of the concurrence of a clock pulse CP from the clock 47 and an advance pulse from an independent unit within the arithmetic and logic unit 7. For example, the first clock pulse after the occurrence of an advance signal usually permits all the first time zone gates to be selected. Advances always occur in sequences though the number of clock pulses between advances may vary. In general, however, if no stimuli occur, four clock pulses are sufficient to operate all of the gates. Not all the gates associated with a time zone are operated when the proper signals occur, the operation of each gate depending upon what instruction is being executed. Most M-instructions will require a large number of clock pulses to cycle through the time zones a plurality of times.

Referring to FIGURE 4b, all of the gates may be (though not all of them are) operated during the period defined by clock pulses CP6, CP7 and CP11, which cause the generation of advance signals 1 through 3 in that order. Due to the occurrence of a stimulus (No. 21) between CP7 and CP8, further gate operation during M-instruction execution is suspended until CP11.

Referring back to FIGURES 1h, 2i and 2j, the following gates may be operated in the first time zone: A through H, 1, 2, 3, SUP, SUQ and SUU. The occurrence of SUP, SUQ and SUU signals causes independent operation of P stream unit 22, Q stream unit 23, and table extract unit 27 to commence. The first time zone is entered only after an advance 1 signal occurs.

The following gates may operate in the second time zone: J through N, 7, 8 and SC. Gates J, K, L and M are selectively operable to transfer one of the Match unit 29 outputs W, X, Y or Z to the latch 101. The output of the logic unit 28 may be transferred to the same latch 101 by operation of gate N. The output of the logic unit 28 may be transferred to the latch 102 by operation of the gate 8, which latch 102 may also be set to contain the contents of the statistical counter SCTR Register 103 by operation of the gate 7. The second time zone may be entered only after the occurrence of an advance 2 signal.

The following gates may be operated in the third time zone: T, 4, 5, 6, 9, 10, 11 or 12. Though gate T may be operated at the same time as gates 9 and 10 to fill the ISR register, it acts upon bytes which are several time zones behind the bytes passed by gates 9 and 10. This delay is due to the longer route taken (through the statistical accumulator 25) by the bytes passed by gate T. Gates Q, R and S may be operated in the third time zone also to selectively transfer all or part of the contents of the statistical accumulator registers 25 to latch 109 for immediate entry into the SACC adder 110 and for transfer to the ISR register.

*Memory.*—With reference to FIGURES 2a and 2b, the memory 1 includes a core storage 21, a memory address register MAR 33, a memory buffer register MBR 34, and an instruction register 35. The particular type of core storage 21 used is immaterial, a cubicle array of coincident-current sensed magnetic cores being used for illustration. The MAR 33 indicates a 64-bit word location in core storage 21, which location may be written into on the write-in bus 31 or read into the MBR 34 via the readout bus 32. The MBR 34 holds three full memory words comprising 192 bits numbered 0 to 191. If these bits represent an instruction they are placed into the instruction register 35. Eight parity bits are usually generated for transmission along with 64-bit memory words.

A typical composite instruction word format is shown as part of the instruction register 35 in FIGURES 2a and 2b. The composite instruction comprises one macro-instruction, labelled M-instruction, and 15 micro-instructions, labelled $\mu$-instructions, divided into five groups: 1–3, 4–6, 7–9, 10–12 and 13–15. The M-instruction comprises a 19-bit address field, a 3-bit operation code field OM, and a 9-bit tag field TM. Each group of three $\mu$-instructions is associated with a 6-bit stimulus field (SA, SB, SC, SD or SE), a 2-bit tag field (TA, TB, TC, TD or TE), and a 24-bit field for holding the three 8-bit $\mu$-instruction operation fields. Thus, each one of the five stimulus fields and tag fields refers to a group of three $\mu$-instructions. Each 6-bit stimulus field can identify any one of 128 stimuli conditions, 60 illustrative ones of which appear in Table I.

*Table I*

| Stimulus # | Stimulus |
|---|---|
| 0 | NOP. |
| 1 | FL1Q. |
| 2 | FL2Q. |
| 3 | FL3Q. |
| 4 | NOP. |
| 5 | FL1P. |
| 6 | FL2P. |
| 7 | FL3P. |
| 8 | SACC THR. |
| 9 | $\overline{W}$. |
| 10 | $\overline{X}$. |
| 11 | $\overline{Y}$. |
| 12 | $\overline{Z}$. |
| 13 | W·X. |
| 14 | W·Y. |
| 15 | CC=0. |
| 16 | NOP. |
| 17 | FL1R. |
| 18 | FL2R. |
| 19 | FL3R. |
| 20 | W. |
| 21 | SCTR=LIM. |
| 22 | X. |
| 23 | X or Y. |
| 24 | SCTR≠LIM·EØG. |
| 25 | SACC<THR·EØG. |
| 26 | SACC + to −. |
| 27 | $\overline{F}$. |
| 28 | $\overline{F}$·LB=1. |
| 29 | $\overline{F}$·KB=1. |
| 30 | $\overline{F}$·MB=1. |
| 31 | Z. |
| 32 | Y. |
| 33 | MB=1. |
| 34 | LB=1. |
| 35 | KB=0. |
| 36 | KB=1. |
| 37 | LB=0. |
| 38 | MB=0. |
| 39 | always on. |
| 40 | EOL U. |
| 41 | MG=1. |
| 42 | LG=1. |
| 43 | KG=0. |
| 44 | KG=1. |
| 45 | LG=0. |
| 46 | MG=0. |
| 47 | always on. |
| 48 | Initial. |
| 49 | F·MB=1. |
| 50 | F·LB=1. |
| 51 | F·KB=0. |
| 52 | F·KB=1. |
| 53 | F·LB=0. |

13

*Table I—Continued*

| Stimulus # | Stimulus |
|---|---|
| 54 | F·MB=0. |
| 55 | F. |
| 56 | F̄·EOG. |
| 57 | MG=1·EOG. |
| 58 | LG=1·EOG. |
| 59 | KG=0·EOG. |
| 60 | KG=1·EOG. |

The stimulus number identifies the source of the stimulus. For example, stimulus No. 21 is shown in FIGURE 2h. The actual conditions represented are a matter of choice.

Each μ-instruction operation field identifies by an 8-bit code, one of 512 adjustments, 75 illustrative ones of which appear in Table II.

*Table II*

| μ-Instruction (Decimal Code) | Adjustment Name |
|---|---|
| 1 | NOP. |
| 2 | Step SCTR by +1. |
| 3 | Reset F and G. |
| 4 | Reset SACC. |
| 5 | Reset SCTR. |
| 6 | Step SACC. |
| 7 | Step SCTR by −1. |
| 8 | Read out 24 bits of SACC to R. |
| 9 | Read out low-order 16 bits of SACC to R. |
| 10 | Read out low-order 8 bits of SACC to R. |
| 11 | Add SCTR to TBA. |
| 12 | Read out low-order 8 bits of SCTR to R. |
| 13 | Read out 16 bits of SCTR to R. |
| 14 | Disable specified ACR triggers for this byte. |
| 15 | Suppress L output for duration of group. |
| 16 | Disable specified ACR triggers for duration of group. |
| 17 | Insert X in L. |
| 18 | Insert MOD in L. |
| 19 | Insert MOD in U. |
| 20 | Insert Y in L. |
| 21 | Insert Z in L. |
| 22 | Insert W in L. |
| 23 | Run out P through this level. |
| 24 | Run out P through FLG 2 level. |
| 25 | Run out P through FLG 1 level. |
| 26 | Run out Q through this level. |
| 27 | Run out Q through FLG 2 level. |
| 28 | Run out Q through FLG 1 level. |
| 29 | Match-only P through this level. |
| 30 | Match-only P through FLG 2 level. |
| 31 | Match-only P through FLG 1 level. |
| 32 | Match-only Q through this level. |
| 33 | Match-only Q through FLG 2 level. |
| 34 | Match-only Q through FLG 1 level. |
| 35 | Store P address. |
| 36 | Store Q address. |
| 37 | Swallow byte after special byte from P. |
| 38 | Swallow special byte output of L. |
| 39 | Swallow special byte into R. |
| 40 | Swallow byte after special byte from Q. |
| 41 | Swallow byte after special byte from U. |
| 42 | Repeat special byte from P. |
| 43 | Repeat special byte from Q. |
| 44 | Repeat special byte from U. |
| 45 | Skip space in R. |

14

*Table II—Continued*

| μ-Instruction (Decimal Code) | Adjustment Name |
|---|---|
| 46 | Skip remaining U extraction of this reference. |
| 47 | Disable match units for run-out. |
| 48 | Advance next level in R. |
| 49 | Advance next level above FL2 in R. |
| 50 | Advance next level above FL1 in R. |
| 51 | Advance next level above FL3 in R. |
| 52 | Reset this level in R. |
| 53 | Reset through level FL2 in R. |
| 54 | Reset through level FL1 in R. |
| 55 | Reset through level FL3 in R. |
| 56 | Advance next level in P. |
| 57 | Advance next level above FL2 in P. |
| 58 | Advance next level above FL1 in P. |
| 59 | Advance next level above FL3 in P. |
| 60 | Reset this level in P. |
| 61 | Reset through level FL2 in P. |
| 62 | Reset through level FL1 in P. |
| 63 | Reset through level FL3 in P. |
| 64 | Reset this level in Q. |
| 65 | Reset through level FL2 in Q. |
| 66 | Reset through level FL1 in Q. |
| 67 | Reset through level FL3 in Q. |
| 68 | Advance next level in Q. |
| 69 | Advance next level above FL2 in Q. |
| 70 | Advance next level above FL1 in Q. |
| 71 | Advance next level above FL3 in Q. |
| 72 | Reference (TBA−1) in place of T address containing special byte. |
| 73 | Skip extraction for T address containing special byte. |
| 74 | Reset T base address to TBA. |
| 75 | Cancel T address containing special byte. |

The adjustment numbers are the decimal code for the 8-bit binary code operation fields. The adjustments performed are arbitrary and dependent upon the environments in which the invention is used.

*The μ-instruction unit.*—The μ-instruction unit 16 shown in FIGURES 2c–2e includes a stimulus register 41, a priority circuit 42, a μ-instruction selector 43, a sequencing ring 44 and a μ-instruction decoder 45. The purpose of the μ-instruction unit 16 is to recognize when a stimulus indicated in a composite instruction stored in the instruction register 35 has occurred in the system and to give sequential effect to the μ-instructions associated with the stimulus.

The stimulus register 41 receives stimuli signals, in accordance with the five stimuli fields in the instruction register 35, via a 6-to-60 decoder 53. Five fields of six bits each are applied to the thirty inputs of the decoder 53, each field being converted to a one-out-of-sixty-bit code, transmitted on 300 output lines. That is, each one of the sixty stimuli which may be defined by a stimulus field is indicated by a different signal on one of the group of sixty output lines corresponding to that field. 60 stimuli from the system enter the register 41 on separate lines. Each of these 60 stimuli are compared with each one of the decoded stimuli fields in comparators CFA 54, CFB 55, CFC 56, CFD 57 and CFE 58. Whenever a stimulus indicated by a stimulus field is the same as a stimulus occurring on one of the 60 stimuli input lines, there will be an output from the comparator for that field. Since it is possible that there will be more than one stimulus, more than one comparator may have an output. Each comparator output is stored in a corresponding one of the triggers TA 59, TB 60, TC 61, TD 62 and TE 63. Thus the one states of the triggers indicate which stimuli coded by stimulus fields in the instruction register 35 have occurred in the system.

The priority circuit 42 gives effect to single ones of these stimuli in sequence. The priority circuit is arbitrary in design as long as it performs its function of selecting one input, of a number of "busy" inputs, at a time. The one shown, comprising four AND circuits 64, 65, 66 and 67, gives precedence to the topmost trigger which was set to the one state. Therefore, if stimulus fields SA and SC both indentify simultaneously occurring stimuli, the stimulus specified by the field SA will be given first precedence. This is accomplished by causing each trigger one output to disable (by signals at inhibiting inputs indicated by a semi-circle) all the AND circuits associated with lower priority triggers. An R3 pulse, to be explained later with reference to the sequence ring 44, occurs after each selected stimulus is given complete effect. This signal is used to reset the trigger in the stimuli register 41 associated with the stimulus field having priority, enabling the priority circuit 42 to give effect to the next indicated stimulus. Five AND circuits 68, 69, 70, 71 and 72 permit this operation to occur, the output of any one of these AND circuits (each of which reset an associated trigger) occurring at R3 time only if the corresponding stimulus field has priority. Only one of the outputs SA, SB, SC, SD and SE of the priority circuit 42 at any one time carrries a signal, that signal identifying the $\mu$-instruction group associated with a stimulus identified by a stimulus field which has been given priority. If any stimulus is given priority, OR circuit 300 emits inhibit signal I which blocks the occurrence of advance signals in the arithmetic and logic unit 7, affects the operation of gates by the instruction routing controls 48 and resets the $\mu$-ring 151 (FIG. 2g).

The $\mu$-instruction selector, explained below, routes $\mu$-instructions from the instruction register 35 to the $\mu$-instruction decoder 45. The particular $\mu$-instruction selected from the group is determined by the stepping of the sequence ring 44 (FIG. 2c).

The sequence ring 44 comprises four triggers 72, 73, 74 and 75, arranged in a well-known manner in conjunction with four diode-capacitor combinations to form a ring circuit. A signal at the step input 76, resulting from the concurrence of a clock pulse CP from the clock 47 and a $\mu$-command from the routing control 46 (in accordance with a $\mu$-instruction) causes the trigger having a one output to change to a zero output and the next trigger to assume a one output. In this way there will aways be a signal at one of the output lines R0, R1, R2, or R3. The signal is advanced in sequence from R0 through R3 back to R0 again once for each four signals at input 76. This permits the sequence ring 44 to be stepped more rapidly (or slowly) than normal instructions, tailoring the time allotted to each $\mu$-instruction to fit the time required to execute it.

The $\mu$-instruction selector 43 includes a matrix of twenty AND circuits 76 through 95 arranged into five rows of four columns. Each one of the five rows of AND circuits gates a different group of three $\mu$-instructions associated with a stimulus field. One of the AND circuits in each row gates the tag field associated with the group of $\mu$-instructions gated by the other AND circuits in that row. For example, the first row, comprising AND circuits 76, 77, 78 and 79, gates the first three $\mu$-instructions O$u$ (1-3) and the associated tag fields TA. The first instruction O$u$ (1) is made available to the AND circuit 77 from the instruction register 35 by cable 96. The second $\mu$-instruction O$u$ (2) operation portion is made available by the instruction register 35 to the AND circuit 78 through the cable 97. The operation portion of the third $\mu$-instruction O$u$ (3) is made available to AND circuit 79 via cable 98. The tag field TA associated with these three $\mu$-instructions is made available to the AND circuit 76 by cable 99.

The input operation and tag fields appear at the associated AND circuit outputs without change whenever there is a coincidence of priority circuit 42 and sequence ring 44 signals at the AND circuit inputs. As the AND circuits 77–79 are selected, the operation fields are sent to the $\mu$-instruction decoder 45 as on output cable 100.

For example, assume that the stimulus field SA associated with the first three $\mu$-instructions describes a stimulus which has occurred in the machine and which has been given priority by the priority circuit 42. There will be a signal on line SA providing one input to each of the AND circuits 76, 77, 78 and 79. As the sequence ring 44 causes a signal to step sequentially among lines R0, R1, R2 and R3, in that order, the AND circuits 76, 77, 78 and 79 will be enabled one at a time, in the same order. AND circuit 76 will be the first one selected causing the TA field to be transferred from the instruction register 35 to the TA decoder and storage 101. When any one of the decoders 101, 102, 103, 104 or 105 receives a tag field TA, TB, TC, TD or TE from the associated AND circuit 76, 80, 84, 88 or 89, it causes a signal to appear on one of the decoder outputs: 00, 01, 10 or 11. These outputs may be used to control $\mu$-instruction subroutines, as will be explained with reference to the tag field circuits 106 in the next paragraph. In summary, as the priority circuit 42 gives effect to machine stimuli identified by stimulus fields present in the composite instruction, rows of the AND circuits in the $\mu$-instruction selector 43 are enabled by lines SA, SB, SC, SD and SE, one at a time in priority order. For each row thus selected the sequence ring 44 may select the columns of AND circuits defined by the lines R0, R1, R2 and R3. After each step sequence ring 44 signal from the routing controls 46, a different column is selected. In the first row the order of selection is 76, 77, 78 and 79, causing instruction register 35 fields TA O$u$ (1), O$u$ (2) and O$u$ (3) to be selected in that order. However, the sequence ring 44 is not necessarily stepped at regular intervals, this depending upon the contents of the tag field and the $\mu$-instruction being executed. For instance, one $\mu$-instruction may be available at the AND circuit 77 output for the period of two clock pulses and another $\mu$-instruction (in the same composite instruction) may be available at the AND circuit 79 output for only one clock pulse period.

Tag field circuits 106 are associated with the tag field decoder and storage circuits 101, 102, 103, 104 and 105. The functions performed by these circuits are purely illustrative, any desired operation being possible. The tag specified by the two bit tag field TA, TB, TC, TD or TE of the $\mu$-instruction group selected by the priority circuit 42 is indicated by a signal on one of the lines 00, 01, 10 or 11. Signals appear on one of these four lines each time that the sequence ring 44 steps to R0. A signal remains on one of the lines as the ring 44 steps to R3 and changes at the next R0 time only if the tag field of the next group of $\mu$-instructions has a different coding. The tag field may be used to control the time of advance of the priority circuit 42. For example, the AND circuit 107 and the OR circuit 108 permit the priority circuit 42 to give effect to another stimulus whenever the sequence ring 44 steps to the R3 condition if the associated tag field is 00. Thus, the subroutine associated with a stimulus is limited to three $\mu$-instructions. If the associated tag field is 10 a gate I1 is enabled through OR circuit 110 to send the third $\mu$-instruction associated with the tag field to the instruction counter 39. The priority circuit 68 is not advanced. The third $\mu$-instruction, in this case, specifies a core storage 21 location where additional $\mu$-instructions will be found. The additional $\mu$-instructions replace the present ones in the instruction register 35. The tag field may also be replaced at this point. The subroutine associated with a tag field coded 10 therefore is not limited in size to the three associated $\mu$-instructions. When the tag field is 11, the priority circuit 42 will be advanced when the sequence ring 44 reaches position R3, via AND circuit 109 and gate I1 will be operated via OR circuit 110. The last $\mu$-instruction, usually containing an address, is sent to the instruction counter 34 and the subroutine associated with the tag field containing the bits 11 is terminated. In this manner a subroutine of M-instructions (each with its own associated μ-instructions) may "interrupt" the program. This permits the apparatus to perform prior art automatic program interrupt operations. The remaining field (01) may designate any one of a number of operations. For instance, execution of one μ-instruction may be made dependent upon the logical relationship of this μ-instruction to another μ-instruction.

The micro-instruction decoder 45 which is similar in function and construction to the M-instruction decoder 36 within the M-instruction unit 5, serves to receive the operation portions of the μ-instructions one at a time as transmitted to it by the μ-instruction selector 43. From each μ-instruction are generated a larger number of μ-commands which in conjunction with the clock 47 generate signals in the routing controls 3 for operating the gates of the arithmetic and logic unit 7.

*Instruction routing controls.*—Referring to FIGURE 2*b*, the instruction routing control 48 (part of the routing controls 3) serves to generate signals which operate gates within the memory 1, the M-instruction unit 5, and the μ-instruction unit 16. These signals are generated by means of well-known circuits controlled by clock signals CP from the clock 47 in accordance with the states of the instructions units as indicated by an inhibit I signal (which occurs when any stimulus is given priority by the priority circuit 42 and the tag fields of M-instructions, if desired. Thus, the operation of the gates may be made dependent upon whether M-instructions or μ-instructions are being executed.

Referring to FIGURE 4*a* there are shown the routing line output pulses which operate gates under control of the clock 47. At clock pulse CP1, gates I2, I3, I4 and I11 are operated to index the present instruction counter 39 contents (the base address of a composite instruction) by passage through the adder 37, at the same time as an increment enters the adder. The effective address will emerge from the adder during the next clock time CP2. The instruction counter 39 is incremented +1 at time CP1, so that a new base address will be available for locating the next instruction.

At clock pulse CP2, gates I6 and I12 are enabled, entering the new effective address into the MAR 33. The addressed composite instruction will enter the MBR 34 in time for use at time CP3.

At clock pulse CP3, gate I7 operates to transfer the addressed composite instruction into the instruction register 35.

At clock pulse CP4, gates I4 and I13 are enabled, gating the M-instruction to the adder 37 and the μ-instruction stimulus field to the stimulus register 41.

At clock pulse CP5 gates I6, I8 and I9 operate to gate the address field of the M-instruction to the arithmetic and logic unit 7 stream units 22 and 23, the operation and tag fields of the M-instruction to the execution register 38 and the operation field of this instruction to the M-instruction decoder 36.

After clock pulse CP5 signals from the instruction routing controls 48 are limited to those giving the arithmetic and logic unit 7 access to the core storage 21. Gate I10 is enabled every second cycle to permit write-in via bus 31 and gate I12 is enabled every cycle to permit changing of the MAR 33 addresses for alternate reading and writing. The routing controls 46 operate the gates shown in FIGURES 2*h*–2*j* at this time in accordance with operations required by M-instructions or μ-instructions. One exception occurs when a μ-instruction contains an address which is to be transferred to the instruction counter 39.

If a μ-instruction with tag 10 occurs it is necessary to replace the associated μ-instruction group in the instruction register 35 with a new group of μ-instructions (and tags) obtained from core storage. If the tag is 11 the operation is similar except that the location of the present composite instruction is stored in core storage 21 and an entirely new subroutine of composite instructions is entered. In either case, the instruction routing controls 48 operate gates I2, I7 and I12 during clock times following the operation of the gate I1 by the tag field circuits 106. The address may then be indexed, as previously described, or sent directly to the MAR 33. The format of the word read into the MBR 34 will determine whether the whole composite instruction in the instruction register 35 is replaced (program interrupt) or whether only one μ-instruction group is changed.

*The routing controls and clock.*—Referring to FIGURES 2*f* and 2*g*, the routing controls 46 (the part of the routing controls 3 not allotted to the instruction routing controls 48) receive M-commands and μ-commands from the M-instruction decoder 36 and the μ-instruction decoder 45. These commands are used to generate signals to operate gates in the arithmetic and logic unit 7 under control of the clock 47.

The clock 47 supplies clock pulse CP signals to M-ring 149 and to the μ-ring 151. Each of these rings utilizes well-known circuitry (similar to the sequence ring 44 previously described) to emit signals on one after another on a number of output lines. The output signal will advance from one line to an adjacent line for each step input. The M-ring 149 is stepped whenever a clock pulse occurs, if an advance signal from advance circuits 200 is present at AND circuit 150. The μ-ring 151 is stepped whenever a clock pulse occurs, if a step μ-ring 151 command signal from the μ-instruction decoder 45 is present at AND circuit 400. The μ-ring 151 is reset by an I signal each time that another stimulus is given priority by the priority circuit 42.

In the initial state of the M-ring 149, a signal is present at the Advance 1 output. An Advance 2 signal will be generated as the result of signals received from the Q and P stream units 22, 23, the Table Extract Unit 27 and other downstream (time zones 2 and 3) units. A signal advance signal will emerge from the advance circuit 200 to step the M-ring from Advance 1 to Advance 2 during the next clock pulse. Subsequent stepping occurs in a similar manner. No stepping will occur if no advance signals arrive from the arithmetic and logic unit 7, even if clock pulses continue. When μ-instruction execution is to be initiated due to the recognition of a stimulus, an inhibit I signal from the priority circuit 42, via the OR circuit 300, blocks the emission of advance signals by the independent units in the arithmetic and logic unit 7. Since the M-ring 149 cannot step without advance signals, execution of the M-instruction is suspended at the current position of the M-ring 149.

In the μ-ring 151 initial state, a signal occurs at the step 1 output. Each time that a new stimulus is given priority by the priority circuit 42, the μ-ring 151 will be reset by an inhibit I signal from the OR circuit 300. The μ-ring 151 is stepped from step 1 to step 2 only if a clock pulse and a step μ-ring 151 command (from the μ-instruction decoder 45) coincide at the inputs of AND circuit 400. Thus each μ-instruction may control the number of clock pulses that will be allotted for execution of its operations. Most micro-instructions will not require more than one step, however.

The routing controls 46 are arranged into a matrix of AND circuits. Each AND circuit is connectable to one row of timing signals from either the M-ring 149 or the μ-ring 151 (each connected to the clock 47) and each AND circuit in the matrix is also connectable to one column of commands from either the M-instruction decoder 36 or the μ-instruction decoder 45. The AND circuits are not necessarily connected to either a row or a column, the wiring being dependent upon the functions desired.

Referring to FIG. 2*f*, for instance, the AND circuit 111 is connected to the command line Select P and to the M-ring 149 output Advance 1, so that if there is a signal on the command line Select P at time Advance 1, there will be an output from the AND circuit 111 applied to the set input of a trigger 118. The one output of trigger 118 is applied to the input of the OR circuit 119, causing signals to be sent to gates SUP, 1 and C. Similarly, AND circuits 112 and 113 are operated at Advance 1 time by their respective command lines Select Q and Select U to set the triggers 120 and 121, causing outputs from OR circuits 122 and 123, which will operate gates SUQ, 2, D, SUU, 3 and E. AND circuits 114, 115, 116 and 117 are enabled at Advance 2 time, to set triggers 124, 125, 126 and 127, causing operation of gates K, L, M, 7 and SC through OR circuits 128, 129, 130, 131, 132. An inhibit input (indicated by a semicircle) to AND circuit 115 illustrates blocking of an output under $\mu$-instruction control.

The triggers are supplied only for use if needed to enable gates for longer than the duration of an advance signal. Since most of the gates in the arithmetic and logic unit 7 are enabled for the period of a single advance signal only, the triggers may be either by-passed or reset one clock pulse after they are set. The trigger 125 illustrates resetting by a signal on a line 403 controlled by $\mu$-instructions.

Only the AND circuits associated with M-commands have been described so far. FIGURE 2g shows that each of the AND circuits in the portion of the matrix allotted to $\mu$-commands is connected to a single command line and to a single $\mu$-ring 151 output. The provision of more than one AND circuit in each column permits more complex $\mu$-instructions to be executed over a sequence of clock pulses. For example, a $\mu$-instruction may cause signals to appear on two $\mu$-command lines. One of these (Block L) may be connected to an AND circuit which enabled by a $\mu$-ring 151 step 1 output and the other (Y-command 500) may be connected to an AND circuit enabled to step 2 time. Therefore, it will take two clock pulses to give effect to the $\mu$-commands. A clock pulse CP will stop the $\mu$-ring 151 only upon the concurrence of a stop $\mu$-ring 151 command at AND circuit 400. The step $\mu$-ring 151 $\mu$-command line does not usually carry a signal, since multi-cycle $\mu$-instructions are unusual (though within the scope of this invention).

If there is a signal on the $\mu$-command line insert-L, AND circuit 137 will emit an output signal which sets the trigger 139 to the one state, causing selection of gate L via OR circuit 129. Similarly, a signal on $\mu$-command line M selects AND circuit 140, setting the trigger 142 to the one state, and enabling gate M via OR circuit 130. Gates L and M will thus be operated by a $\mu$-command though not currently operated by M-commands. The $\mu$-command line SCTR−1 (statistical counter step direction) operates AND circuit 143, to set the trigger 144 to the one state, if the $\mu$-command SCTR step (statistical counter step time) has occurred simultaneously. If the $\mu$-instruction SCTR step has not occurred simultaneously, the trigger 144 will be reset through the inverter 145 to prevent an output from the trigger. This is necessary since the absence of a SCTR−1 $\mu$-command is defined as a SCTR+1 $\mu$-command. The inverter 145 destroys old SCTR−1 commands if a new SCTR−1 command does not occur at the time of the SCTR step $\mu$-command. The output of the trigger 144 is applied to the −1 input of the SCTR control counter 30 (FIG. 2h) via an OR circuit not shown. Signals appearing on $\mu$-command line SCTR step enable AND circuit 146 to set the trigger 148 to the one state, and enable the gate SC via the OR circuit 132.

It is also possible for $\mu$-commands to disable gates operated by M-commands, which gates are frozen in the enabled condition due to failure of the M-ring 149 to advance. For example, $\mu$-command block L causes an output from AND circuit 401 at $\mu$-ring 151 time step 1, setting the trigger 402 and blocking the AND circuit 115 via an inhibit input connected to line 403. The trigger 125 is reset by this same signal causing deselection of gate L. Note that as soon as the $\mu$-command block L ends, the trigger 125 will again assume the one state to select gate L.

In summary, as soon as a stimulus is given priority, an inhibit I signal is sent to the arithmetic and logic unit 7, blocking further M-ring 149 advance pulses. As a result, the current state of all M-command operated gates remains unchanged. The $\mu$-commands then select additional gates, or disable presently selected ones. Since $\mu$-command alignments affect reset inputs etc., the statements made with respect to gates apply to these also.

OPERATION OF DETAILED EMBODIMENT

The operation of the apparatus shown in FIGURES 2a–2i embodying the invention will now be described with reference to FIGURES 3, 4a and 4b.

Referring first to FIGURE 3, there is shown a sample format for a group of three $\mu$-instructions contained within a composite instruction held in the instruction register 35. The contents of the associated M-instruction and of the other $\mu$-instruction groups are irrelevant to an explanation of the operation of the invention and are therefore not illustrated. It will be assumed that an M-instruction is being executed when the illustrated stimulus ($SA=21$) occurs. The operation of the specific embodiment will be explained with reference to the suspension of execution of this M-instruction and the execution of a subroutine of three $\mu$-instructions ($Ou$ (1)$=N$, $Ou$ (2)$=N$ and $Ou$ (3)$=21$) when a stimulus (21) specified in the stimulus field SA occurs. The tag field ($TA=00$) is associated with the SA stimulus field and the three $\mu$-instructions $Ou$ (1), $Ou$ (2) and $Ou$ (3).

The SCTR register is assumed to be initially set to the number five, the SCTR limit 151 containing the number seven. The SCTR comparator 152 compares the limit value and the number (the register 103 contents either incremented or decremented) in the SCTR control counter 30. As a result, if during the M-instruction execution the SCTR register is increased by one (to six), the SCTR comparator 152 will subsequently emit stimulus number 21. Since the SA field specified number 21 (see Table I) executtion of the three $\mu$-instructions associated with the SA field will begin upon occurrence No. 21. Reference to Table II identifies the $\mu$-instructions as performing the following adjustments: SCTR−1, SCTR−1, and insert K. Since the associated tag field TA is set to 00, the subroutine terminates after the third $\mu$-instruction. These $\mu$-instructions are chosen to be illustrative only, and are not necessarily the best ones to respond to the particular stimulus.

Referring now to FIGURES 4a and 4b, there are shown a series of clock pulses, CP1–CP95, which issue from the clock 47. The effect of CP1–CP12 and CP90–CP95 on the memory 1 and M-instruction unit 5 gates and of CP6–CP13 on the arithmetic and logic unit 7 gates will be explained. The first five clock pulses CP1–CP5 are effective to cause operation of the instruction routing controls 48 to bring a composite instruction into the instruction register 35, and set up the system for the execution of the instruction. In this particular example, the stimulus specified by the SA field occurs between CP7 and CP8. The M-instruction in the instruction register 35 is executed beginning from time CP6. Therefore, two advance signals will have occurred when stimulus number 21 suspends execution of the M-instruction. During the suspension of M-instruction execution, three $\mu$-instructions will be executed at times CP9, CP10 and CP11. Each one of these illustrative $\mu$-instructions is executed in single clock pulse time, though other $\mu$-instructions may require more than one clock pulse time for execution. The M-instruction execution is resumed at clock pulse 11 (Advance 3) and continues thereafter until clock pulse CP90, prior to which time a $\mu$-instruction with a tag field 10 was encountered. This tag field causes one of the μ-instructions to be transferred to the instruction counter 39 as the address of further μ-instructions which will continue the μ-instruction subroutine associated with the stimulus which initiated this particular subroutine. The new group of μ-instructions is read from the core storage 21 into the portion of the instruction register 35 allotted to that group of μ-instructions and thereafter is transferred to μ-instruction decoder 45 by μ-instruction selector 43 in the normal manner.

During clock pulses CP1 through CP5 of the clock 47, signals are emitted from corresponding outputs of the instruction routing controls 48, to perform operations essentially identical to those previously described with reference to the instruction routing control, FIG. 4a. At CP1 operation of gate I2 causes read out of the contents (a base address) of the instruction counter 39. The adder 37 will take approximately one clock pulse time to generate the effective address of the composition instruction shown in part in FIGURE 3. At clock pulse CP2, the results emitted by the adder 37 will specify the location of the composite instruction in core storage 21. At clock pulse CP3, gate I7 is operated to transfer the composite instruction (which contains the group of μ-instructions previously explained with reference to FIGURE 3) to the instruction register 35. At clock pulse CP4, gate I4 reads out the entire M-instruction from the instruction register 35 into the adder 37, gate I3 transfers the μ-instruction stimulus fields SA–SE to the 6-to-60 decoder 53. As previously described, each of the μ-instruction stimulus fields will be decoded from the six bit 5-field code to a one-out-of-sixty code for comparison in the comparators 54 through 58 with the sixty stimuli entering from the arithmetic and logic unit 7. It is assumed that at clock pulse 4 time no stimuli specified by stimulus fields have occured, so that all of the triggers 59 through 63 will remain set to the initial state 0. At the clock pulse CP5, gate I6 passes the address field of the M-instruction from the adder 37 to the P and Q stream units 22 and 23, gate I8 transfer M-instruction operation and tag fields from the adder 37 to the execution register 38 and gate I9 thereafter transfers the operation field to the M-instruction decoder 36. Gates I8 and I9 may either be operated together as shown in FIGURE 4a, or operation of gate I9 may be delayed until the contents of the execution register 38 can be utilized by the routing controls 46.

After the occurrence of clock pulse CP5, the routing of the composite instruction is completed, the system now beginning to execute the M-instruction, the operation field of which was placed in the M-instruction decoder 36. M-commands, specified by whatever M-instruction is in the instruction register 35, appear in the routing controls 46.

At clock pulse CP6, referring to FIGURE 46, gates A through F, H, 1, 2, SUP, SUQ and SUU are selected due to the occurrence of an advance 1 signal output (enter time zone 1) from the M-ring 149. The SUP, SUQ and SUU signals select the P-stream unit 22, the Q-stream unit 23, and the table extract unit 27, in that order. The P and Q stream units have received the address part of the M-instruction in the instruction register 35 and proceed to gain access to memory (during subsequent clock pulses) to bring out a number of memory words from which streams of bytes are generated. As each byte is emitted by a stream unit, it is entered into an associated one of latches 49, 50 and 100 (FIGURE 2i) automatically. The operation of gates C, D, and E causes one set of bytes to be transferred from these latches to the ISC, ISD and ISE registers. The operation of gate B supplies a byte to the table extract unit 27 from the latch associated with the table address assembler 26 in the same manner. Gates 1 and 2 are operated to transfer bytes from the P stream unit 22 and the Q stream unit 23 to the IS 1 register and IS 2 register respectively.

Gate A is operated to transfer the previous contents (if any) of the IS 2 register (FIGURE 2h) which will have been automatically placed in the associated latch, into the ISLBA registers. The match unit 29 receives bytes from the P and Q stream units 22 and 23 and the table extract unit 27, without the operation of any gates. When the P and Q stream units 22 and 23, and the table extract unit 27, have completed their operations they will generate signals resulting in an advance 2 signal which causes the advance circuit 200 to generate an advance signal to the AND circuit 150. Upon the occurrence of the next clock pulse, CP7, the M-ring 149 will step to the advance 2 condition (enter time zone 2).

At clock pulse CP7 the routing control 3 will emit signals N, 7, 8 and SC. Operation of one of gates J, K, L or M will cause a selected byte to be entered into the latch 101 from the match unit 29. In this particular example none of the gates are operated at this time, the latch 101 receiving instead a byte from the logic unit 28 by operation of gate N. Latch 102 receives the contents of the SCTR control register 103 by operation of the gate 7. Signal SC operates gate SC to update the SCTR control register 103 contents (5) from the SCTR control counter 30, which contains the present contents of the SCTR control register 103, incremented by one (that is: 6). The SCTR control limit 151 contents (7) are compared with the register 103 contents after another incrementation (contents=7) in the comparator 152. As a result a stimulus signal 21 will emerge between clock pulses CP7 and CP8. The conditions of the logic unit 28 and match unit 29 (among others) are sensed by the advance circuit 200 in order to determine whether the occurrence of the next clock pulse CP8 should cause the M-ring 109 to advance to the Advance 3 position (enter the third time zone). During the operation of these gates as just described, the incrementation of the statistical counter has resulted in a number (7) in the SCTR counter 30, equal to the number (7) in the SCTR control limit 151. As a result the SCTR control comparator 152 emits a stimulus 21 before the statistical accumulator can signal an advance 3 request.

The occurrence of stimulus 21, which matches the SA field in the instruction register 35, results in an output from the comparator CFA 54 in the stimulus register 41, causing the trigger TA59 to be set to the one state. Priority circuit 42 emits an output on line SA, all other outputs being blocked by inhibit inputs to the AND circuits 64, 65, 66, 67. The sequence ring 44 being initially set to place a signal on the R0 line, a coincidence of R0 and SA signals will occur at AND circuit 76 in the μ-instruction selector 43. As a result the TA tag field (00) is sent to the TA decoder and storage 101, causing a signal to appear on line 00, which is applied to AND circuit 107. The occurrence of the SA output from the priority circuit 42 causes an inhibit I signal to emerge from the OR circuit 200. This inhibit signal is applied to all of the major units in the system as well as the μ-ring 151 (resetting it). The occurrence of an inhibit signal I at the logic unit 28 and match unit 29 prevents the normal occurrence of an advance 3 signal. The M-ring 149 does not advance, "freezing" the arithmetic and logic unit 7 in its present state, effectively suspending the execution of the M-instructions.

At the rise of the CP8 signal, the μ-instruction decoder causes a μ-command step sequence ring 44 signal to advance the ring to the R1 position, selecting AND circuit 77, which transfers the μ-instruction Ou (1) to the μ-instruction decoder 45. The resultant μ-commands will be given effect during the clock time CP8.

At clock pulse CP8, the μ-ring 151 remains set to step 1. Since the first μ-instruction (7) is "step SCTR−1" command lines SCTR−1 and SCTR step have signals applied to them by the μ-instruction decoder 45. A coincidence of signals on these lines and the line step one from the μ-ring 151 cause signals to appear on the output lines SC and −1. The signal −1 is applied to the SCTR control counter 30, causing the cable 105 to indicate contents in the SCTR control register 103, decremented by one, which quantity (5) is entered into the SCTR control register 103 via the signal applied to the gate SC. In this way the SCTR control register 103 contents are decreased by one. The fall of the clock pulse CP8 occurs in conjunction with a step sequence ring 44 μ-command from the μ-instruction decoder 45, advancing the ring 44 to the R2 position. AND circuit 78 is selected causing the μ-instruction O*u* (2) to be sent to the μ-instruction decoder 45. The resultant μ-commands will be executed during the next clock pulse time CP9.

At clock pulse CP9 the μ-ring 151 does not step any further than step one because there is no μ-command "step μ-ring 151." The μ-instruction O*u* (2) contents (stop SCTR−1) cause μ-commands SCTR step and SCTR−1 to occur which results in routing control 46 outputs SC and −1 signals to be sent to the SC gate and the −1 input of SCTR counter 30. Operation of the SC gate causes the contents (5) of the SCTR control register 103, which are decremented by one (to 4) in the SCTR control counter 30 to be updated (to 4). As a result the contents of the SCTR control register 103 are again decremented by one. The fall of the clock pulse 9 in conjunction with a step sequence ring 44 μ-command causes the sequence ring 44 to be stepped to the R3 position, AND circuit 79 being selected. The third μ-instruction O*u* (3) is transferred to the μ-instruction decoder 45, which generates μ-commands given effect during the next clock pulse CP10.

At clock pulse CP10 the μ-ring 151 remains set to the step 1 position for the execution of the μ-instruction O*u* (3) which calls for an insertion from the Z match unit. This operation causes the byte in the latch 101, received from the Logic Unit 28, to be moved to the ISR register and its place taken by a byte from the match units 29. The μ-command insert K in combination with a step one signal selects the AND circuit 133, which via the OR circuit 128 causes operation of gate K, and via the OR circuit 901 causes operation of the gate 9. The operation of gate K causes a byte to be transferred from the match unit 29 to the latch 101. The byte previously placed in the latch 101 by the logic unit 28 is transferred to the ISR register by operation of gate 9. In this way, room is made in a stream for an additional byte from the match unit 29.

In the tag field circuits 106, the occurrence of the R3 signal from the sequence ring 44 causes an output from the AND circuit 107, which enables AND circuit 68, resetting trigger TA 59. This enables another trigger, if any is set to the one state by a stimulus, to receive service from the priority circuit 42. Since in this example it is assumed that no other stimulus field describes a stimuli which has occurred, the execution of the suspended M-instruction will be resumed. This is made possible by the absence of outputs on any of the lines SA, SB, SC, SD or SE, which terminates the inhibit I signal from the OR circuit 300, permitting the M-ring 149 to advance to the Advance 3 state (enter third time zone) at the beginning of the next clock pulse CP11.

At clock pulse CP11, gates 4, 5 and 10 will be operated to transfer bytes to the ISTP, ISTQ and ISS registers. The byte entered into the ISR register during CP10 will be processed by the R stream unit 24. Subsequently entered bytes will be automatically processed to convert streams of bytes into parallel data words for storage in memory. This process continues independently. During CP11, the R stream unit 24 emits an Advance 1 signal.

At CP12 time zone 1 is re-entered and processing of the M-instruction continues. Prior to clock pulse CP90 a stimulus is recognized which corresponds to the particular stimulus field of a group of μ-instructions having a tag field 10. The third μ-instruction in the group associated with this tag field specifies an address in core storage 21, where additional μ-instructions may be found to continue this subroutine. Therefore, when the sequence ring 44 steps to the R3 condition there will be an output from AND circuit 109 in the tag field circuits 106 which via OR circuit 110 causes gate I1 to be operated at CP90. The particular one of the AND circuits 83, 87, 91 and 95 associated with the μ-instruction which contains this address is operated to transfer the address via the gate I1 to the instruction counter 39.

At clock pulse CP91 the gate I2 is operated in conjunction with the gate I12 to enter this address into the MAR 33. This address is transferred from the MAR to core storage 21 and will cause a new group of μ-instructions to be available at the MBR 34 during the next clock cycle CP92.

At clock pulse CP92 the contents of the MBR 34 are transferred to the instruction register 35 by operations of gate I7, replacing the μ-instruction group operation portions and tag field related to the μ-instruction having the tag 10. The execution of the μ-instruction subroutine now continues during the suspension of the M-instruction as before.

In summary, there has been described a system wherein a composite instruction specifies an M-instruction and stimuli related μ-instructions which are executed, during suspension of M-instruction execution, upon the occurrence of one or more of the related stimuli. The execution of the M-instruction is resumed upon completion of the execution of stimuli related μ-instruction subroutines. When more than one indicated stimulus occurs, the related subroutines are executed in priority order. If a subroutine requires more μ-instructions than are associated with a stimulus, additional μ-instructions may be obtained from memory.

While the invention has been particularly shown and described with reference to a preferred embodiment thereof, it will be understood by those skilled in the art that the foregoing and other changes in form and details may be made therein without departing from the spirit and scope of the invention.

In the claims:

1. A program controlled data processing system, including: first means for supplying a program of first instructions of one class; second means for supplying a number of subroutines of second instructions of another class; first means connected to said first supplying means for gaining access to successive ones of said first instructions; first control means connected to said first means and operable in accordance with successive ones of said first instructions to generate control signals for controlling, in steps, processing of data in said system; means for generating stimulus signals indicative of conditions in said system during processing of data; means connected to said generation means and to said first control means, operative upon the occurrence of a stimulus signal, to temporarily freeze generation of control signals at a current one of said processing steps; second means connected to said second supplying means and to said generation means, operable, upon the occurrence of a stimulus signal, to gain access to successive ones of said second instructions in said subroutines of second instructions; and second control means connected to said second means and operable by second instructions accessed by said second means, to generate control signals for controlling processing of data in said system during said temporary freezing of control signals from first control means.

2. In combination: a plurality of units for processing data; a plurality of gates interconnecting said units for the transfer of data among said units; first instructions means initially operable to generate at its output first sets of commands in accordance with first types of instructions received at its input; second instruction means selectively operable to generate at its output second sets of commands in accordance with second types of instructions received at its input; a clock for generating timed signals; routing means having a first input connected to said first and second instructions means outputs, a second input connected to said clock and outputs connected to said gates, for generating gate control signals, at said output, specified by said first and second sets of commands at said first input as a function of said clock signals at said second input; means connected to said processing units for generating signals upon the detection of a number of conditions which may occur in said units during processing; and means connected to said detection signal generation means, said second instruction means and to said routing means, operative upon the occurrence of a detection signal to suspend the effect of said clock signals upon said first set of commands in said routing means and to make said second instruction means operative to supply said second sets of commands to said routing means input for generation of gate control signals.

3. A data processing system wherein processing of data is controlled in accordance with a stored program of operation specifying macro-instructions, and a number of adjustment-specifying micro-instructions grouped into subroutines, including: means operable to gain access to said macro-instructions in sequence; means connected to said access means operable to control step-by-step processing of data in said system in accordance with operations specified by said accessed macro-instructions; means for detecting the occurrence of a number of conditions in said system; first signal means connected to said detecing means for emitting a first signal indicative of the occurrence of said condition; means connected to said first signal means operable upon the occurrence of said first signal to suspend at the current step, the processing of data in accordance with macro-instructions; means connected to said detecting means and said first signal means operable subsequent to the occurrence of said first signal to supply, in sequence, micro-instructions at an output; means connected to said micro-instruction supply means output for controlling said system in accordance with adjustments specified by said micro-instructions as supplied; second signal means connected to said supply means operable to emit a second signal indicating the end of a subroutine of micro-instructions; and means, connected to said second signal means, operable upon the occurrence of said second signal to disable said macro-instruction suspension means, for resuming processing of data in accordance with said macro-instructions at said current step.

4. A data processing system wherein processing of data is controlled in accordance with a stored program of operation specifying macro-instructions, and a number of adjustment specifying micro-instructions grouped into subroutines, including: means operable to gain access to said macro-instructions in sequence; means connected to said access means operable to control step-by-step processing of data in said system in accordance with operations specified by said accessed macro-instructions; means for detecting the occurrence of a plurality of conditions in said system; selection means for connections to said detection means for selecting said detected conditions in sequence one at a time; first signal means connected to said selection means for emitting first signals each indicative of the selection of one of said plurality of conditions; means connected to said first signal means operable upon the occurrence of said first signals to suspend, at the current step, the processing of data in accordance with macro-instructions; means connected to said detecting means and said first signal means operable subsequent to the occurrence of said first signals to supply, in sequence, micro-instructions at an output; means connected to said micro-instruction supply means output for controlling said system in accordance with adjustments specified by said micro-instructions as supplied; second signal means connected to said supply means operable to emit a second signal indicating the end of a subroutine of micro-instructions; and means, connected to said first and second signal means, operable upon the occurrence of said second signal alone to disable said macro-instruction suspension means, for resuming processing of data in accordance with said macro-instructions at said current step.

5. A data processing system wherein processing of data is controlled in accordance with a stored program of operation-specifying macro-instructions, and a number of adjustment-specifying micro-instructions grouped into subroutines, including: means operable to gain access to said macro-instructions in sequence; means connected to said access means operable to control step-by-step processing of data in said system in accordance with operations specified by said accessed macro-instructions; means for specifying a number of conditions out of a plurality of conditions which may occur in said system; means connected to said specification means for detecting the occurrence of specified ones of said plurality of conditions in said system; selection means connected to said detection means for selecting said detected conditions in sequence one at a time; first signal means connected to said selection means for emitting first signals each indicative of the selection of said plurality of conditions; means connected to said first signal means operable upon the occurrence of said first signals to suspend at the current step, the processing of data in accordance with macro-instructions; means connected to said detecting means and said first signal means operable subsequent to the occurrence of said first signals to supply, in sequence, micro-instructions at an output; means connected to said micro-instruction supply means output for controlling said system in accordance with adjustments specified by said micro-instructions as supplied; second signal means connected to said suply means operable to emit a second signal indicating the end of a subroutine of micro-instructions; and means, connected to said first and second signal means, operable upon the occurrence of said second signal alone to disable said macro-instruction suspension means, for resuming processing of data in accordance with said macro-instructions at said current step.

6. In a data processing machine: means for sequencing the machine through a program of steps, each of which includes a number of instruction steps and a number of subroutine steps: means for detecting the occurrence of a plurality of conditions during a current instruction step; means for producing during said current instruction step priority scanning of said detected conditions to permit automatic suspension of the program during said current instruction step; and means responsive to said priority means to sequence the machine through selected ones of said number of subroutines associated with said current instruction.

7. A data processing apparatus including: a source of composite instructions, each including a first part and a second part; means connected to said instruction source operable to generate data processing control signals in accordance with said first part and said second part of successive ones of said composite instructions; selection means connected to said generation means for making said generation means initially operative in a first mode to generate control signals in accordance with said instruction first parts, said selection means being operable in a second mode to make said generation means operative to generate control signals in accordance with said instruction second parts; means for indicating the occurrence of selected conditions in said apparatus; and means connected to said indication means and to said selection means operable upon the occurrence of selected conditions to disable said selection means first mode and enable said second mode.

8. A system for processing data in accordance with instructions, including: means for storing composite instructions, each composite instruction including a number of first instruction types and a number of groups of second instruction types; means connected to said storing means for making available at an output successive ones of said composite instructions; first interpreting means connected to said output operable to generate a plurality of successive sets of signals, in accordance with each one of said first instruction types made available at said output, for controlling processing of data in said system; second interpreting means connected to said output operable to generate signals, in accordance with successive ones of said second instruction types, from said groups of second instruction types made available at said output, for controlling the processing of data in said system; detection means for generating signals indicative of conditions occurring within said system during the processing of data in said system; and means connected to said detection means and to said first and second interpreting means, operative upon the occurrence of a condition indicative signal for suspending operation of said first interpreting means, maintaining a current set of said successive sets of generated signals, and making operable said second interpreting means.

9. In a program controlled data processing machine controlled by a program comprising a series of instructions steps each of which may specify a number of conditions: means for detecting the occurrence of a plurality of conditions during the operation of the machine under control of a current instruction step; means operative during said current instruction step for producing selectively ordered monitoring of said conditions; means for permitting an automatic suspension of the program during said current instruction step under control of a condition selected by said selective monitoring means which corresponds to a condition specified in said current instruction step.

10. Instruction controlled apparatus, including: a source of instructions, each instruction including a number of operation parts and a number of condition manifestations; a source of adjustments; routing means connected to said instruction source, and to said adjustment source, operable to generate routing signals for controlling said apparatus in a first mode in accordance with operation parts and in a second mode in accordance with adjustments; means for sensing conditions in said apparatus; means connected to said sensing means and to said instruction source operable to compare said conditions with ones of said number of condition manifestations and operable to generate recognition signals upon the occurrence of an identity; a means connected to said comparison means and to said routing means for causing said routing means to be initially operative in said first mode, and operable upon the occurrence of a recognition signal to make said routing means operative in said second mode.

11. A system for processing data in accordance with instructions, including: means for storing composite instructions, each composite instruction including a number of operation indicating instruction fields and a number of groups of condition indicating fields; means connected to said storing means for making available at an output successive ones of said composite instructions; operation interpreting means connected to said output operable to generate a plurality of successive sets of control signals, in accordance with each one of said operation fields made available at said output, for controlling processing of data in said system; a source of subroutines; execution means connected to said subroutine source operable to generate control signals in accordance with said subroutines for controlling processing of data in said system; detection means for generating condition signals indicative of conditions occurring within said system during the processing of data in said system; condition recognition means connected to said output and to said detection means operable to generate recognition signals as a function of the identity of successive ones of said condition fields, from said groups of condition fields made available at said output, with said condition signals generated by said detection means; and means connected to said condition recognition means, to said operation interpreting means and to said subroutine execution means, operative upon the occurrence of a recognition signal to suspend operation of said operation interpreting means maintaining a current set of said successive sets of generated signals, and making operable said subroutine execution means.

12. In a data processing machine: means for sequencing the machine through a program of operation steps, each operation step defining an instruction and a group of subroutines and conditions; means for detecting a plurality of conditions occurring during a current instruction and producing indications thereof; means for selectively monitoring said indications; means for permitting an automatic suspension of said current instruction when a monitored condition and one of said group of conditions correspond; means for sequencing the machine through the group of subroutines associated with aforesaid monitored condition during suspension of said current instruction; and means for resuming said current instruction upon completion of all said subroutines associated with monitored conditions.

13. Instruction controlled apparatus, including: a source of instructions, each instruction including a number of operation parts, a number of adjustments, and a number of condition manifestations; routing means connected to said instruction source operable to generate routing signals for controlling said apparatus in a first mode in accordance with operation parts and in a second mode in accordance with adjustments; means for sensing conditions in said apparatus; means connected to said sensing means and to said instruction source operable to compare said conditions with said number of condition manifestations and operable to generate recognition signals upon the occurrence of identities; and means connected to said comparison means and to said routing means for causing said routing means to be initially operative in said first mode, and subsequently operable upon the occurrence of recognition signals to make said routing means operative in said second mode.

14. A system for processing data in accordance with instructions, including: means for storing composite instructions, each composite instruction including a number of first instruction types, and a number of groups of second instruction types, each group having associated with it a number of condition indicators; means connected to said storing means for making available at an output successive ones of said composite instructions; first interpreting means connected to said output operable to generate a plurality of successive sets of routing signals, in accordance with each one of said first instruction types made available at said output, for controlling processing of data in said system; second interpreting means connected to said output operable to generate routing signals, in accordance with successive ones of said second instruction types, from said groups of second instruction types made available at said output, for controlling the processing of data in said system; detection means for generating stimulus signals indicative of conditions occurring within said system during the processing of data in said system; comparison means connected to said detection means and to said output for generating recognition signals when a condition indicated in said composite instruction corresponds to a condition indicated by a stimulus signal; and means connected to said comparison means and to said first and second interpreting means, operative upon the occurrence of a recognition signal to suspend operation of said first interpreting means, maintaining a current set of said successive sets of generated control signals, and making said second interpreting means operable, to generate routing signals in acordance with second instructions types from the group associated with aforesaid condition indicator which corresponds to aforesaid stimulus signal.

15. A program controled data processing system, including: a memory for storing at addressable locations data and composite instructions, each composite instruction comprising a macro-instruction, a plurality of micro-instruction groups and a plurality of stimulus fields, each stimulus field being associated with one micro-instruction group; an instruction counter for indicating memory locations; an instruction register connected to said memory for receiving composite instructions from memory locations specified by said instruction counter; a macro-instruction decoder connected to said instruction register operable to generate data processing commands in accordance with macro-instructions; a clock for generating clock signals; an advance circuit connected to said clock operable to generate advance signals as a function of said clock signals; a first routing means connected to said macro-instruction decoder and to said advance circuit for generating sets of routing signals in accordance with commands from said macro-instruction decoder and advance signals from said advance circuits; a stimulus field decoder connected to said instruction register for emitting identification signals representative of stimuli specified by said stimulus fields; means for monitoring said system to detect the occurrence of a plurality of conditions during the processing of data and for generating stimuli signals representative of conditions that have occurred in said system; comparison means connected to said stimulus field decoder and to said monitoring means for emitting a recognition signal for each correspondence of an identication signal and a stimulus signal; priority means connected to said comparison means operable upon the occurrence of one or more recognition signals to select recognition signals singly in priority order; selection means connected to said priority means and to said instruction register operable upon the selection of a recognition signal by said priority means to sequentially transfer from said instruction register to an output, micro-instructions, from the group of micro-instructions associated with the stimulus field related to said selected recognition signal; inhibiting means connected to said priority means and associated with said advance circuits operative upon the occurrence of recognition signals to suspend operation of said advance circuits causing freezing of a current set of said routing signals; and a micro-instruction decoder connected to said selection means output and to said routing means for supplying micro-commands, in accordance with micro-instructions selected by said selection means, to said routing means for generating routing signals in addition to, and in place of, said frozen set of routing signals.

16. In a data processing system: means for sequencing the machine through a program of instructions, each instruction defining a group of subroutines and conditions; means for detecting a plurality of conditions occurring during a current instruction and producing indications thereof; means for selectively monitoring said indications; means for permitting an automatic interruption of said program of instructions at a time following the correspondance of a monitored condition and one of said group of conditions; means for sequencing the machine through the group of subroutines associated with aforesaid monitored condition after interruption of said program of instructions; and means for resuming said program of instructions upon completion of all said subroutines associated with monitored conditions.

References Cited by the Examiner

UNITED STATES PATENTS

| 3,015,441 | 1/1962 | Rent et al. | 235—157 |
| 3,036,773 | 5/1962 | Brown | 235—157 |
| 3,039,690 | 6/1962 | Yandell | 235—157 |
| 3,042,305 | 7/1962 | Edward et al. | 235—157 |
| 3,061,192 | 10/1962 | Terzian | 235—157 |

ROBERT C. BAILEY, *Primary Examiner.*

MALCOLM A. MORRISON, *Examiner.*